(12) United States Patent
Freda et al.

(10) Patent No.: US 11,234,242 B2
(45) Date of Patent: Jan. 25, 2022

(54) METHODS AND SYSTEMS FOR SCHEDULING IN UU-BASED VEHICLE-TO-VEHICLE COMMUNICATION

(71) Applicant: INTERDIGITAL PATENT HOLDINGS, INC., Wilmington, DE (US)

(72) Inventors: Martino M. Freda, Laval (CA); Benoit Pelletier, Roxboro (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 393 days.

(21) Appl. No.: 16/088,675

(22) PCT Filed: Mar. 23, 2017

(86) PCT No.: PCT/US2017/023793
§ 371 (c)(1),
(2) Date: Sep. 26, 2018

(87) PCT Pub. No.: WO2017/172479
PCT Pub. Date: Oct. 5, 2017

(65) Prior Publication Data
US 2020/0305167 A1 Sep. 24, 2020

Related U.S. Application Data

(60) Provisional application No. 62/315,262, filed on Mar. 30, 2016, provisional application No. 62/366,152, filed on Jul. 25, 2016.

(51) Int. Cl.
*H04W 4/00* (2018.01)
*H04W 72/04* (2009.01)
(Continued)

(52) U.S. Cl.
CPC ....... *H04W 72/0493* (2013.01); *H04L 1/1642* (2013.01); *H04W 4/40* (2018.02);
(Continued)

(58) Field of Classification Search
CPC .......... H04J 2203/0069; H04W 72/04; H04W 72/12; H04W 72/0406; H04L 5/0048
See application file for complete search history.

(56) References Cited

U.S. PATENT DOCUMENTS 8,830,949 B2    9/2014  Zhou et al.
2010/0040005 A1*  2/2010  Kim ..................... H04J 11/0069
                                                    370/329

(Continued)

FOREIGN PATENT DOCUMENTS

WO    2011015250 A1    2/2011
WO    2016/022849 A1   2/2016
WO    2017/011106      1/2017

OTHER PUBLICATIONS

Huawei et al., "Constraint for Multiple Sidelink Transmissions," 3GPP TSG-RAN WG2 Meeting #93, R2-161074, Malta (Feb. 15-19, 2016).

(Continued)

*Primary Examiner* — Shantell L Heiber
(74) *Attorney, Agent, or Firm* — Volpe Koenig

(57) ABSTRACT

A method for operation in a WTRU may comprise transmitting, from the WTRU to an eNB, a request for SPS resources including a periodicity of the requested SPS resources and a time offset indicative of a time in which the WTRU expects have an SPS resource allocated. The method may further comprise receiving, by the WTRU from the eNB, in response to the transmitted request for SPS resources, an SPS configuration. The time offset of the transmitted request may include a subframe number (SFN) offset with respect to SFN 0 of the WTRU. The received SPS (Continued)

configuration may correspond to a PC5 interface and the SPS configuration may be received over a physical downlink control channel (PDCCH).

17 Claims, 10 Drawing Sheets

(51) Int. Cl.

| | | |
|---|---|---|
| H04W 76/11 | (2018.01) | |
| H04W 4/40 | (2018.01) | |
| H04L 1/16 | (2006.01) | |
| H04W 72/10 | (2009.01) | |
| H04W 72/14 | (2009.01) | |
| H04W 80/02 | (2009.01) | |
| H04W 92/18 | (2009.01) | |

(52) U.S. Cl.
CPC ..... *H04W 72/042* (2013.01); *H04W 72/0446* (2013.01); *H04W 72/10* (2013.01); *H04W 72/14* (2013.01); *H04W 76/11* (2018.02); *H04W 80/02* (2013.01); *H04W 92/18* (2013.01)

(56) References Cited

U.S. PATENT DOCUMENTS

| | | | |
|---|---|---|---|
| 2012/0082119 A1 | 4/2012 | Chung et al. | |
| 2013/0308549 A1 | 11/2013 | Madan et al. | |
| 2014/0023008 A1* | 1/2014 | Ahn | H04L 5/0053 370/329 |
| 2014/0133447 A1* | 5/2014 | Moulsley | H04W 72/1278 370/329 |
| 2014/0241260 A1* | 8/2014 | Schmidt | H04W 88/02 370/329 |
| 2015/0085719 A1 | 3/2015 | Yin et al. | |
| 2015/0223212 A1* | 8/2015 | Der Velde | H04L 5/0032 370/329 |
| 2015/0249974 A1* | 9/2015 | Lee | H04W 72/042 370/329 |
| 2015/0282148 A1* | 10/2015 | Le | H04W 72/0406 370/329 |
| 2015/0305012 A1 | 10/2015 | Yi et al. | |
| 2016/0338094 A1* | 11/2016 | Faurie | H04W 72/085 |
| 2016/0345352 A1* | 11/2016 | Langereis | H04B 1/40 |
| 2017/0048903 A1 | 2/2017 | Yi et al. | |
| 2017/0171837 A1 | 6/2017 | Chen et al. | |
| 2019/0053215 A1* | 2/2019 | Yu | H04W 28/0268 |

OTHER PUBLICATIONS

Third Generation Partnership Project, "Technical Specification Group Radio Access Network; Study on LTE-based V2X Services; (Release 14)," 3GPP TR 36.885 V1.0.0 (Mar. 2016).
Third Generation Partnership Project, "Technical Specification Group Radio Access Network; Study on LTE-based V2X Services; (Release 14)," 3GPP TR 36.885 V14.0.0 (Jun. 2016).
Ericsson, "Discussion on Uu Enhancements for V2X," 3GPP TSG-RAN WG2 #93, R2-161565, Malta (Feb. 15-19, 2016).
Intel Corporation, "Open aspects of priority handling for ProSe communication," 3GPP TSG RAN WG2 Meeting #91, R2-154385, Malmö, Sweden (Oct. 5-9, 2015).
Intel et al., "Introduction of ProSe Priority and QoS," SA WG2 Meeting #110AH, S2-152839, Sophia Antipolis, France (Aug. 31-Sep. 3, 2015).
Interdigital et al., "Clean up and corrections for eD2D," 3GPP TSG-RAN WG2 Meeting #93, R2-161805, St. Julian's, Malta (Feb. 15-19, 2016).
Lee et al., U.S. Appl. No. 62/290,938 (Feb. 3, 2016).

Nokia Networks, "Mapping between logical channel priority and LCG and SL BSR reporting," 3GPP TSG-RAN WG2 Meeting #91bis, R2-154816, Malmö, Sweden (Oct. 5-9, 2015).
Vice-Chairwoman (Interdigital), "Report of the LTE break-out session (ProSe, eDRX, V2X, LATRED)," 3GPP TSG RAN WG2 #91 bis, R2-154891, Malmö, Sweden (Oct. 5-9, 2015).
Dahlman et al., *4G LTE/LTE-Advanced for Mobile Broadband*, Academic Press pp. 1-431 (2011).
Ericsson, "Sidelink Resource Allocation in V2X," 3GPP TSG-RAN WG2 #93, R2-161566, Malta (Feb. 15-19, 2016).
ETSI, "Intelligent Transport Systems (ITS); Vehicular Communications; Basic Set of Applications; Part 2: Specification of Cooperative Awareness Basic Service," ETSI EN 302 637-2 V1.3.2 (Nov. 2014).
Huawei et al., "Discussions on CAM Characteristics," 3GPP TSG-RAN WG2 Meeting #94, R2-163807, Nanjing, China (May 23-27, 2016).
Intel Corporation, "Presentation of Specification to TSG: TS 36.464, Version 2.0.0," 3GPP TSG-RAN Meeting #71, RP-160436, Göteborg, Sweden (Mar. 7-10, 2016).
Interdigital, "Details on SPS for V2X," 3GPP TSG-RAN WG2 #95bis, R2-166872, Kaohsiung, Taiwan (Oct. 10-14, 2016).
Interdigital, "Discussion on SPS for V2V," 3GPP TSG-RAN WG2 #95, R2-165059, Göteborg, Sweden (Aug. 22-26, 2016).
Interdigital, "Possible SPS Enhancements for V2X," 3GPP TSG-RAN WG2 #93bis R2-162825, Dubrovnik, Croatia (Apr. 11-15, 2016).
LG Electronics et al., "New SI proposal: Feasibility Study on LTE-based V2X Services," 3GPP TSG RAN Meeting #68, RP-151109, Malmö, Sweden (Jun. 15-18, 2015).
LG Electronics, Inc. et al., "Proposed TP for UL SPS enhancements," 3GPP TSG-RAN2 Meeting #94, R2-164082, Nanjing, China (Apr. 11-15, 2016).
Qualcomm Incorporated, "RAN2 aspects of V2X," 3GPP TSG-RAN WG2 Meeting #91 Bis, R2-154800, Malmö, Sweden (Oct. 5-9, 2015).
Third Generation Partnership Project, "Technical Specification Group Radio Access Network; Evolved Universal Terrestrial Radio Access (E-UTRA); Medium Access Control (MAC) protocol specification (Release 13)," 3GPP TS 36.321 V13.0.0 (Dec. 2015).
Third Generation Partnership Project, "Technical Specification Group Radio Access Network; Evolved Universal Terrestrial Radio Access (E-UTRA); Medium Access Control (MAC) protocol specification (Release 13)," 3GPP TS 36.321 V13.5.0 (Mar. 2017).
Third Generation Partnership Project, "Technical Specification Group Radio Access Network; Evolved Universal Terrestrial Radio Access (E-UTRA);Medium Access Control (MAC) protocol specification (Release 14)," 3GPP TS 36.321 V14.2.0 (Mar. 2017).
Third Generation Partnership Project, "Technical Specification Group Services and System Aspects; Study on LTE support for Vehicle to Everything (V2X) services (Release 14)," 3GPP TR 22.885 V14.0.0 (Dec. 2015).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300 V14.1.0 (Dec. 2016).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.7.0 (Mar. 2017).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.2.0 (Dec. 2015).
Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V13.0.0 (Dec. 2015).
Third Generation Partnership Project, "Technical Specification Group Radio Access Network; Evolved Universal Terrestrial Radio Access

(56) References Cited

OTHER PUBLICATIONS (E-UTRA); Radio Resource Control (RRC); Protocol specification (Release 14)," 3GPP TS 36.331 V14.2.0 (Mar. 2017).
Third Generation Partnership Project, "Technical Specification Group Radio Access Network; Evolved Universal Terrestrial Radio Access (E-UTRA); Radio Resource Control (RRC); Protocol specification (Release 13)," 3GPP TS 36.331 V13.5.0 (Mar. 2017).
Third Generation Partnership Project, "Technical Specification Group Radio Access Network; Evolved Universal Terrestrial Radio Access (E-UTRA);Physical layer procedures(Release 13)," 3GPP TS 36.213 V13.1.0 (Mar. 2016).
Third Generation Partnership Project, "Technical Specification Group Radio Access Network; Evolved Universal Terrestrial Radio Access (E-UTRA); Physical layer procedures (Release 13)," 3GPP TS 36.213 V13.5.0 (Mar. 2017).
Third Generation Partnership Project, "Technical Specification Group Radio Access Network; Evolved Universal Terrestrial Radio Access (E-UTRA); Physical layer procedures (Release 14)," 3GPP TS 36.213 V14.2.0 (Mar. 2017).
Third Generation Partnership Project, "Technical Specification Group Services and System Aspects; Study on LTE support for V2X services (Release 14)," 3GPP TR 22.885 V0.2.0 (Apr. 2015).
Vice-Chairwoman (Interdigital), "Report from LTE Break-Out Session (ProSe and V2X)," 3GPP TSG-RAN WG2 Meeting #93, R2-161810, St. Julian's, Malta (Feb. 15-19, 2016).
Vice-Chairwoman (Interdigital), "Report from LTE Break-Out Session (V2V, V2X, FeD2D, LATRED)," 3GPP TSG-RAN WG2 Meeting #94, R2-164420, Nanjing, China (May 23-27, 2016).
Vice-Chairwoman (Interdigital), "Report from LTE Break-Out Session (V2V, V2X, FeD2D, LATRED)," 3GPP TSG-RAN WG2 Meeting #95, R2-165840, Göteborg, Sweden (Aug. 22-26, 2016).

\* cited by examiner

| 4 bit interval indicator value | Configured interval |
|---|---|
| 0000 | 100 milliseconds |
| 0001 | 200 milliseconds |
| 0010 | 300 milliseconds |
| 0011 | 400 milliseconds |
| 0100 | 500 milliseconds |
| 0101 | 600 milliseconds |
| 0110 | 700 milliseconds |
| 0111 | 800 milliseconds |
| 1000 | 900 milliseconds |
| 1001 | 1 second |

| Exemplary Trigger Events | | | |
|---|---|---|---|
| Acceleration Control | Dangerous Goods | Latitude | Public Vehicle Type | Street Name |
| Ambient Air Temperature | Dimension | Light Bar In Use | Reference Position | Temperature |
| Autonomous Mode | Direction | Line Ref | Road Segment ID | Traffic Light Priority |
| System Capabilities | Distance | Long Acceleration | Route Ref | Turn Advice |
| Cause Code | Distance To Stop Line | Longitude | Schedule Deviation | Turn Direction |
| Confidence | Door Open | Occupancy | Simple System State | Under 18 Driver |
| Crash Status | Elevation | Pos Confidence Ellipse | Siren In Use | Vehicle Speed |
| Curvature | Emergency Response Type | Position Confidence | Speed | Vehicle Type |
| Curvature Change | Exterior Lights | Priority | Station Length | Wiper System Event |
| Data Reference | Heading | Point Line Description | Station Width | Yaw Rate |

FIG. 8

METHODS AND SYSTEMS FOR SCHEDULING IN UU-BASED VEHICLE-TO-VEHICLE COMMUNICATION

CROSS REFERENCE TO RELATED APPLICATIONS

This application is the U.S. National Stage, under 35 U.S.C. § 371, of International Application No. PCT/US2017/023793 filed Mar. 23, 2017, which claims the benefit of U.S. Provisional Application Ser. No. 62/315,262, filed Mar. 30, 2016 and U.S. Provisional Application Ser. No. 62/366,152, filed Jul. 25, 2016 the contents of which are hereby incorporated by reference herein.

BACKGROUND

Vehicle-to-vehicle (V2V), vehicle-to-infrastructure (V2I), and vehicle-to-pedestrian (V2P) (collectively referred to as vehicle-to-everything (V2X)) are vehicular communication systems in which vehicles and roadside units are the communicating nodes in a communication network. These nodes provide each other with information, such as safety warnings and traffic information. In a cooperative approach, vehicular communication systems may be more effective at avoiding accidents and traffic congestions than if each vehicle tries to solve problems individually.

Direct device-to-device (D2D) communications have begun being supported by major standardization bodies like the Institute of Electrical and Electronics Engineers (IEEE) or the Third Generation Partnership Project (3GPP). In the case of 3GPP and Long Term Evolution (LTE) based radio access, support for D2D communications is being introduced to allow for cost-efficient and high-capability public safety communications using LTE technology. This is firstly motivated by the desire to harmonize the radio access technology across jurisdictions in order to lower the capital expenditures (CAPEX) and operating expenses (OPEX) of radio-access technology available for the use of public safety (PS) type of applications. This is secondly motivated by the fact that LTE as a scalable wideband radio solution allows for efficient multiplexing of different services types like voice and video.

Since PS applications typically require radio communications in areas that are often not under radio coverage of an LTE network, for example, in tunnels, in deep basements, or following catastrophic system outages, there is a need to support D2D communications for PS in absence of any operating network or prior to the arrival of AdHoc deployed radio infrastructure. However, even when operating in presence of operating network infrastructure, PS communications may typically still require higher reliability than commercial services.

V2X communications standards and technologies may be developed based on the current D2D LTE specifications, in addition to potential enhancements to LTE, in both D2D and non-D2D, to meet requirements of the services subgroup to the 3GPP Technical Specification Group on Service and System Aspects (SA1).

SUMMARY

Methods, apparatuses and systems are provided for aligning a generation and transmission of a cooperative awareness message (CAM) to a semi-persistent scheduling (SPS) resource timing based on an SPS configuration, including transmitting an indication to change an SPS configuration to a node-B based on a trigger event, wherein the indication to change the SPS configuration includes a request to change at least one of a scheduling interval and an offset of a current SPS configuration, reconfiguring the current SPS configuration based on the indication to change the SPS configuration, and transmitting the CAM using SPS resources according to the changed SPS configuration.

A method for operation in a wireless transmit/receive unit (WTRU) may comprise transmitting, from the WTRU to an evolved Node B (eNB), a request for semi-persistent scheduling (SPS) resources including a periodicity of the requested SPS resources and a time offset indicative of a time in which the WTRU expects have an SPS resource allocated. The method may further comprise receiving, by the WTRU from the eNB, in response to the transmitted request for SPS resources, an SPS configuration. The time offset of the transmitted request may include a subframe number (SFN) offset with respect to SFN 0 of the WTRU. The received SPS configuration may correspond to a PC5 interface. The SPS configuration may be received over a physical downlink control channel (PDCCH).

BRIEF DESCRIPTION OF THE DRAWINGS

A more detailed understanding may be had from the following description, given by way of example in conjunction with the accompanying drawings wherein:

FIG. 8 is a list of exemplary trigger events for SPS reconfiguration.

DETAILED DESCRIPTION

Figure 1A:
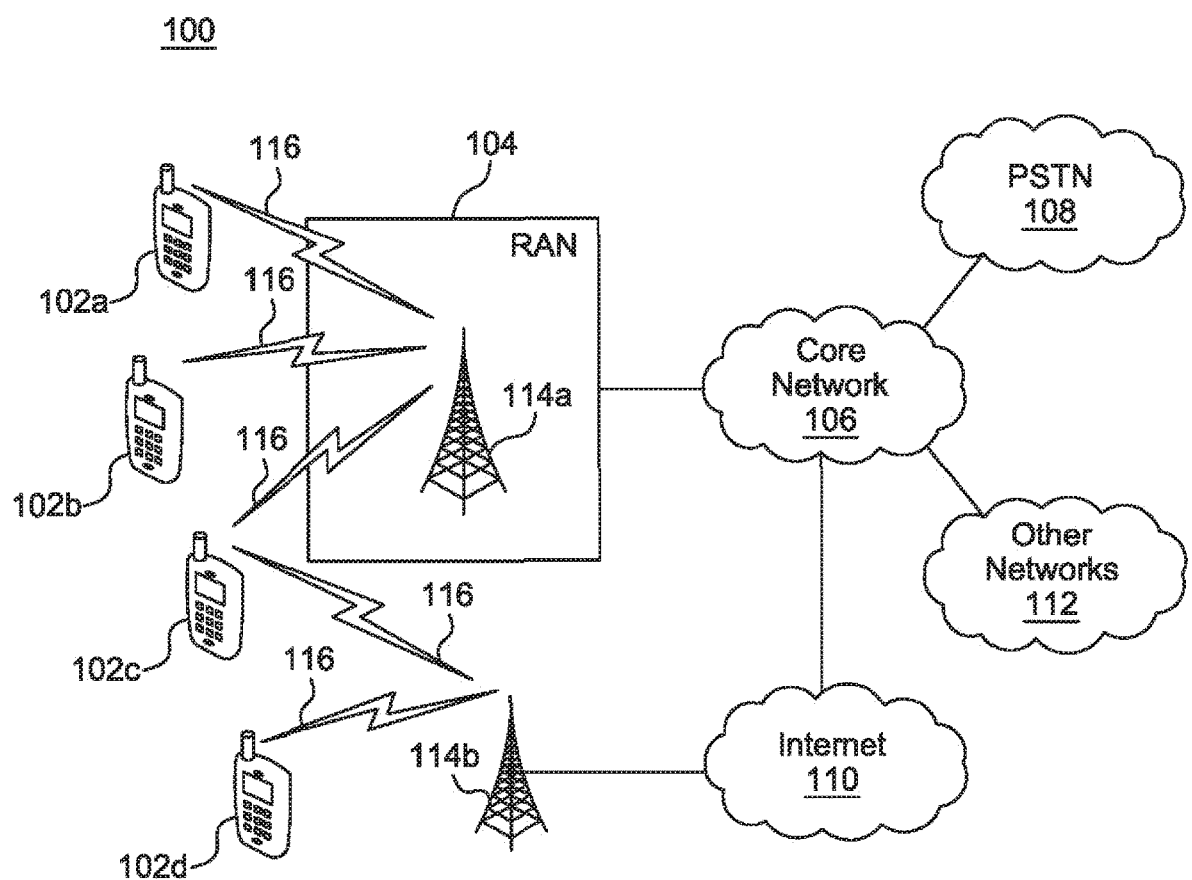
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102*a*, 102*b*, 102*c*, 102*d* in the communications system 100 may include multi-mode capabilities, i.e., the WTRUs 102*a*, 102*b*, 102*c*, 102*d* may include multiple transceivers for communicating with different wireless networks over different wireless links. For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
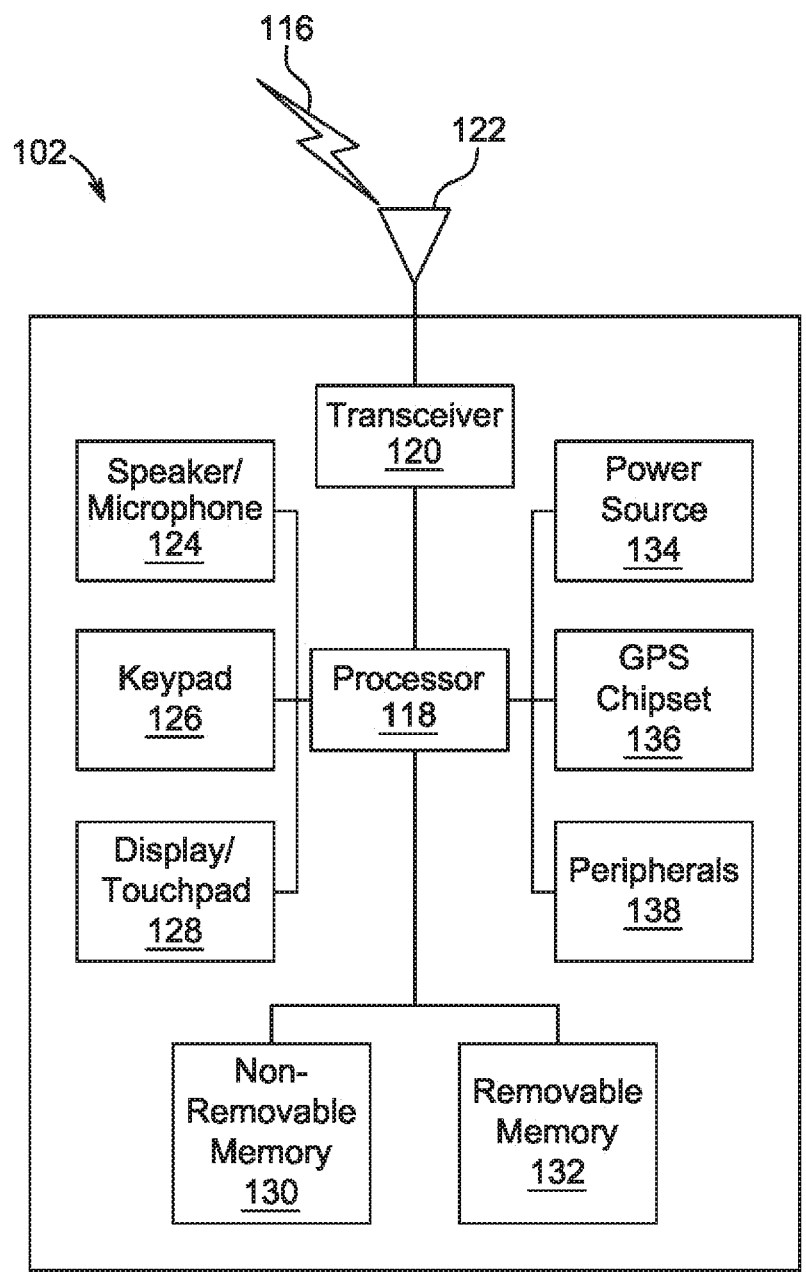
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
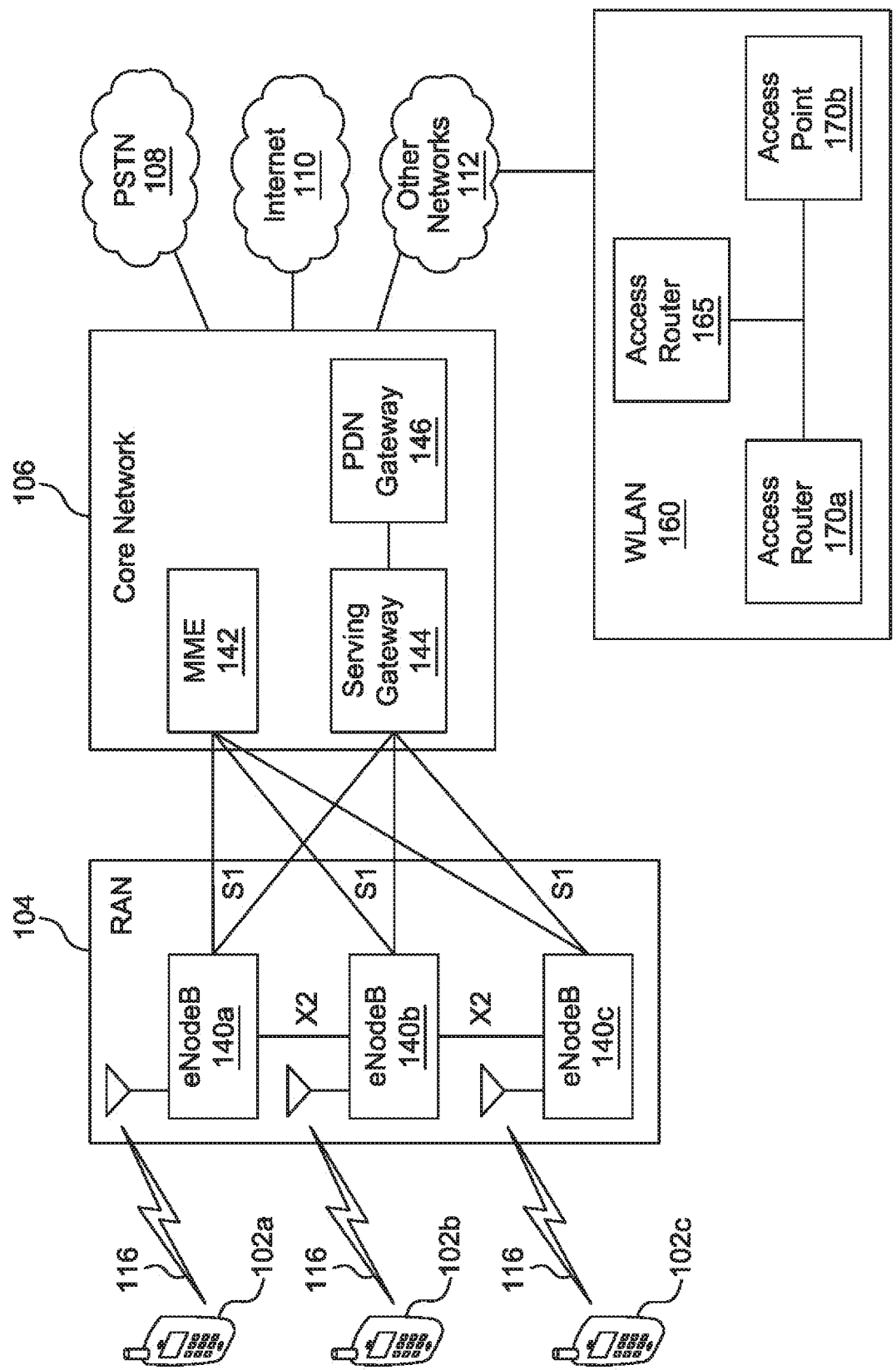
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102*a*, 102*b*, 102*c* over the air interface 116. The RAN 104 may also be in communication with the core network 106.

The RAN 104 may include eNode-Bs 140*a*, 140*b*, 140*c*, though it will be appreciated that the RAN 104 may include any number of eNode-Bs while remaining consistent with an embodiment. The eNode-Bs 140*a*, 140*b*, 140*c* may each include one or more transceivers for communicating with the WTRUs 102*a*, 102*b*, 102*c* over the air interface 116. In one embodiment, the eNode-Bs 140*a*, 140*b*, 140*c* may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an Si interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the Si interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Other network 112 may further be connected to an IEEE 802.11 based wireless local area network (WLAN) 160. The WLAN 160 may include an access router 165. The access router may contain gateway functionality. The access router 165 may be in communication with a plurality of access points (APs) 170a, 170b. The communication between access router 165 and APs 170a, 170b may be via wired Ethernet (IEEE 802.3 standards), or any type of wireless communication protocol. AP 170a is in wireless communication over an air interface with WTRU 102d.

Vehicle-to-vehicle (V2V), vehicle-to-infrastructure (V2I), and vehicle-to-pedestrian (V2P) (collectively referred to as vehicle-to-everything (V2X)) are vehicular communication systems in which vehicles and roadside units are the communicating nodes in a communication network, providing each other with information, such as safety warnings and traffic information. As a cooperative approach, vehicular communication systems may be more effective in avoiding accidents and traffic congestions than if each vehicle tries to solve these problems individually.

Generally, vehicular networks are considered to contain two types of nodes: vehicles and roadside stations. Both are dedicated short-range communications (DSRC) devices. DSRC typically works in the 5.9 GHz band with a bandwidth of 75 MHz and approximate range of about 1000 meters.

A standard for vehicular communications, including, V2V, V2I, and V2P, may be developed by adapting current LTE specifications. For example, V2V communications using an existing device-to-device (D2D), for example, ProSe, framework may be considered.

V2X communications requirements have been developed in 3GPP by SA1. Specifically, these requirements call for transmission of short messages, in the order of 50 to several hundred bytes, with high reliability at the AS level (e.g., up to 90%), and with low latency, for example, as small as 100 ms, in order to support specific use cases such as forward collision warning, control loss warning, and emergency stop.

D2D communications is being developed for public safety (PS) communications using LTE technology. Since PS applications typically require radio communications in areas that are often not under radio coverage of an LTE network, e.g. in tunnels, in deep basements, or following catastrophic system outages, there is a need to support D2D communications for PS in absence of any operating network or prior to the arrival of an AdHoc deployed radio infrastructure. However, even when operating in the presence of operating network infrastructure equipment, PS communications may typically still require higher reliability than commercial services.

PS type applications, for example, between first responders, may at the very least include direct push-to-talk speech services using multiple talk groups. Additionally, PS type applications to make efficient use of the capabilities an LTE broadband radio provides may include services such as video push or download.

It is expected that once deployed, D2D communications may be available not only for PS type applications, but also for commercial use cases. One example may be the case of utility companies who often also require support for 2-way radio communications in areas not covered by network infrastructure. Furthermore, D2D services such as discovery may be suitable signaling mechanisms to allow for proximity based services and traffic offload using LTE based radio access in commercial use cases.

D2D communications using LTE based radio access may be designed to operate in network-control mode and in WTRU autonomous mode, hereafter referred to as Mode 1 and as Mode 2, respectively. Mode 1 (i.e., network controlled) may only be possible under certain conditions, for example, if the D2D terminal is in radio range of a LTE base station. The D2D terminal may fall back to Mode 2 (i.e., WTRU autonomous) operation in case the WTRU cannot communicate with the LTE base station. In this case, it will mostly use channel access parameters pre-stored on the terminal itself.

For D2D communications using Mode 1, the LTE base station may reserve a selected set of uplink (UL) subframes to allow for D2D transmissions. The LTE base station may also announce a set of UL subframes with associated parameters in which D2D communications for neighbor cells or Mode 2 terminals might be received. Not necessarily all LTE system bandwidth (BW) may be available for D2D transmissions in a subframe reserved for D2D. When operating in Mode 1, radio resources for D2D communications may be granted to a D2D terminal by the serving cell. The D2D grant from the network may be preceded by an UL transmission by the terminal on the cellular UL channel indicating to the base station the amount of available D2D data. The D2D grant received by the D2D terminal from the LTE base station on the cellular DL channel allows the D2D terminal to use certain selected radio resources, i.e., some radio blocks (RBs) occurring in some subframes over a certain scheduling period.

A D2D terminal may transmit a Scheduling Assignment (SA) message in a first set of one or more D2D subframe(s) and then it may transmit the D2D data in a second set of D2D subframes in a scheduling period. Scheduling assignments, amongst others, may contain an identifier field, a modulation and coding scheme (MCS) field, a resource indicator and a timing advance (TA) field. D2D data packets, amongst others, may contain a medium access control (MAC) header with source and destination address. Multiple logical channels may be multiplexed and sent as part of a single transport block (TB) in a given D2D subframe by a WTRU.

For D2D communications using Mode 2, the D2D terminals may select time/frequency radio resources autonomously. Channel access parameters such as the subframes for use with transmissions of SA control messages and corresponding D2D data, scheduling periods or monitoring subframes may be pre-configured and stored on the D2D terminal. Except for the preceding UL traffic volume indication and DL D2D grant phase, Mode 2 terminals may follow the same transmission behavior as the Mode 1 terminals and will also transmit SAs followed by D2D data in scheduling periods.

Both for D2D communications Mode 1 and Mode 2, D2D terminals may also transmit auxiliary D2D signals, such as for example D2D synchronization signals and channel messages to aid receivers in demodulating their transmissions.

D2D communications using LTE based radio access may carry voice channels or data packets or data streams. A special case of D2D communications is D2D discovery service. D2D discovery, unlike voice channels may typically only require small packet transmissions that may often fit in one, two or few at most subframes. For example, these packets may contain application data announcing availability of devices or software (SW) applications to participate in D2D data exchanges with terminals in the vicinity.

D2D discovery may or may not use the same channel access protocol such as that used for D2D communications for voice or generic D2D data. For D2D discovery when in coverage of an LTE base station, D2D discovery resources may be allocated separately from those used for D2D communications with voice or generic D2D data. Radio resources for D2D discovery messages may be selected autonomously by D2D terminals from a set of reserved resources by the eNB and periodically recurring time-frequency radio resources in certain UL subframes (e.g., Type 1 discovery) or they may be explicitly allocated by the LTE serving cell to the D2D terminals (e.g., Type 2 discovery). The latter case is similar to D2D communications Mode 1. Transmissions of scheduling assignments may not be necessary when transmitting D2D discovery messages. In some cases, however, even D2D terminals only transmitting D2D discovery messages may still be required to transmit auxiliary D2D synchronization signals to assist receivers.

3GPP is currently evaluating the feasibility of V2X communications based on the current D2D LTE specifications, in addition to identifying potential enhancements to LTE (both D2D and potentially non-D2D) required to meet SA1 requirements. As part of this feasibility study, 3GPP has identified four main V2X scenarios.

Scenario 1 supports V2V operation only based on PC5. PC5 includes transmission of V2X data from a source WTRU, for example, a vehicle, to a destination WTRU, for example, another vehicle, road infrastructure device, a pedestrian, or the like, via ProSe Direct Communication over a PC5 interface between the WTRUs (sidelink).

Scenario 2 supports V2V operation only based on Uu. Uu includes transmission of V2X data from a source WTRU (e.g., a vehicle) to a destination WTRU (e.g., another vehicle, road infrastructure, a pedestrian, etc.) via an eNB over a Uu interface (uplink and downlink).

Scenario 3A includes a WTRU that transmits a V2X message to other WTRUs in sidelink. One of the receiving WTRUs is a WTRU type roadside unit (RSU) which receives the V2X message in sidelink and transmits it to E-UTRAN in uplink. E-UTRAN receives the V2X message from the WTRU type RSU and then transmits it to multiple WTRUs at a local area in downlink.

Scenario 3B includes a WTRU that transmits a V2X message to E-UTRAN in uplink and the E-UTRAN transmits the V2X message to one or more WTRU type RSUs. Then, the WTRU type RSU transmits the V2X message to other WTRUs in sidelink.

LTE may use semi-persistent scheduling (SPS) as its form of semi-static resource allocation which is used to avoid scheduling overhead associated with dynamic scheduling of resources for services with regular occurring transmissions of relatively small payloads (e.g. VoIP). SPS is possible for both uplink and downlink transmissions.

For uplink SPS, as new data arrives in a buffer of a WTRU, the WTRU may report an indication of its buffer status using a buffer status report (BSR) message. BSR control elements typically contain a logical channel group ID and one or more fields corresponding to buffer size. A sidelink specific BSR may also include a destination index since any sidelink buffered data is for transmission to another WTRU instead of the reporting eNB.

With SPS, a terminal may be provided with scheduling on a physical download control channel (PDCCH) to indicate a grant that is valid for every $N^{th}$ subframe. The periodicity or value of N, of the SPS resources is provided by radio resource control (RRC) signaling, while the activation/deactivation and details of the resources is provided by PDCCH signaling using the SPS cell radio network temporary identifier (C-RNTI). A dynamic scheduling command occurring in the same subframe as an SPS resource may take precedence over the SPS resource. Such behavior is useful in the case where the regular resource allocated to a WTRU need to be increased occasionally.

SPS retransmissions for downlink may always be dynamically scheduled, while, for uplink, they may be dynamically scheduled, or they may follow the semi-persistently allocated subframes. SPS is further only supported in the primary cell (PCell) or primary secondary cell (PSCell) (in the case of dual connectivity (DC)).

One of the basic message types transmitted for V2X as V2X traffic is a cooperative awareness message (CAM). CAM messages contain cooperative awareness information that road users and roadside infrastructure exchange to be informed of other vehicle's position, dynamics and attributes. Regular exchange of such information may be key for several road safety and traffic efficiency applications.

The CAM is composed of specific containers, which may be mandatory or optional. Each CAM message may contain at least one basic container (which contains basic information related to the originating intelligent transport systems station (ITS-S) and one high-frequency container which contains highly dynamic information of the originating ITS-S. In addition, a CAM message may also contain one low frequency container which contains static and not highly dynamic information of the originating ITS-S and one or more special containers which contains information specific to the vehicle role of the originating vehicle ITS-S—namely for special vehicles.

Some exemplary ITS elements include active traffic management systems, traffic cameras for monitoring weather, traffic congestion, or other incidents, variable message signs which may contain amber alerts or other messages, highway advisory radios, road and weather information systems, ramp meter, traffic data collectors and traffic management centers.

The transmission of CAM messages may be periodic, with certain deviations or adjustments in the period which are based on vehicle heading, vehicle speed, vehicle position, and the time elapsed since the last generation of a CAM message. In addition, the low frequency container must be included in a CAM if the time elapsed since the generation of the last CAM with the same low frequency container is equal or greater than 500 ms. This same rule applies also to the special container.

In order to employ V2X communications, the E-UTRAN should be able to support a maximum latency of 100 ms for the majority of use cases. While a pre-crash sensing use case has a more stringent requirement of 20 ms, the basic assumption in 3GPP for standardization of any V2X-related enhancements has been a 100 ms requirement for the latency associated with the RAN.

SPS is a preferred candidate for transmission of V2V messages in the UL for scenario 2 and scenario 3 described above due to the mainly periodic nature of CAM traffic. However, UL capacity on Uu is difficult to meet for SPS periods of 40 ms or less due to the large number of vehicles in an urban scenario that would need to transmit in the uplink, and so larger SPS periods may need to be considered.

Methods for determining, reporting and receiving SPS periodicity and offset change indicators are provided. Latency in transmission of a CAM message by the E-UTRAN may be comprised one or more of the following factors. As a first component, latency may be comprised of a time between when the CAM message is generated by the V2X application and when the next UL SPS resource allocated to the WTRU becomes available. As a second component, latency may be comprised of a time required for receiving and processing the CAM message at the network and may further depend on whether the CAM message is sent to the core network, or whether processing remains at the eNB. As a third component, latency may be comprised of a time required for transmitting the message in the downlink channel to the destination WTRU using Single-cell Point-to-Multipoint (SC-PTM), evolved Multimedia Broadcast Multicast Service (eMBMS), or unicast scheduling.

As the SPS period increases, the portion of the latency attributed to the first component increases. Such increase may only be avoided if the CAM message generation is truly periodic and if the SPS period may be aligned with CAM message generation.

Based on the CAM generation frequency, true periodicity may not be assumed and the CAM generation pattern, as compared to the SPS pattern, may undergo the changes in periodicity and changes in offset.

Changes in periodicity may occur in the CAM generation pattern. For example, the CAM generation interval may be changed dynamically, moving between 100 ms, when the vehicle position, heading, and speed is changing, and 1 second, when the vehicle position, heading, and speed is not changing. Furthermore, there may be periods of time where the periodicity may be anything between these values, for a number of CAM generation intervals specified by the cooperative awareness (CA) basic service. As a result, the CAM generation period may dynamically change over time and take on any period between 100 ms and 1 second, in theory.

Changes in offset may occur in the CAM generation pattern. Transitions between one CAM interval and another CAM interval when such intervals are not multiples of 100 ms may result in a change in offset between the message generation and a fixed SPS schedule.

Accordingly, these changes in the CAM message generation pattern may result in an increase in the first latency component, and potentially not meet the latency requirements of 100 ms when SPS is used.

In addition, there may be a variable payload size. SPS is best suited to periodic traffic having a fixed resource allocation size, such as Voice over Internet Protocol (VoIP). Although deviations in the message size may be easily handled through dynamic scheduling, frequent dynamic scheduling may result in increased scheduling overhead and significantly reduce the benefit of SPS. Such a reduction in the benefit may be even more pronounced in the case of V2V traffic, where the assumption (at least for the urban scenarios) is that a dense concentration of vehicles exists, and those vehicles need to receive such dynamic scheduling on a regular basis. On the other hand, over allocating resources results in a waste of SPS resources that could be utilized by the scheduler for other purposes.

CAM messages may be around 190 bytes when they include only a high-frequency container or around 300 bytes when they contain the high frequency container and one or more low-frequency containers. It is also possible that CAM messages with the special container deviate from these sizes. The CAM messages sizes are therefore quite variable. An SPS allocation size may be defined in more dynamic way without relying solely on dynamic scheduling.

It should be understood that the term D2D data may refer to any type of D2D related communication between D2D terminals. For example, without loss of generality, D2D data may include data packets, such as those carrying voice or segments thereof, it may include internet protocol (IP) packets or segments thereof, such as those used for file downloading or uploading, streaming or bi-directional video, it may include D2D control signaling, and/or it may include D2D discovery or service or availability messages. Furthermore, embodiments described herein are described in the general context of the 3GPP D2D communications feature but the concept may be applicable to other features such as D2D discovery, for example.

The following concepts are introduced herein: a WTRU may send a requested offset or offset change for SPS; a WTRU may send an indication to change an SPS configuration; a WTRU may send an indication to release specific resources; multiple SPS configurations may be provided and activation/deactivation methods of the configurations are disclosed; SPS message size may be configured through an application layer; SPS message size may be associated with a QCI for the logical channel; allocation size changes may be piggybacked on SPS transmissions; methods for periodic increases of SPS allocation size are disclosed; WTRU may request SPS based on a trigger from an application; enhancements to an SPS configuration may be received by a WTRU. Enhancements may include the format and timing of the assistance information, allowable offsets WTRU may request change to, an index of an SPS configuration, allowable logical channels for the SPS configuration or resource configuration. A new trigger for sidelink BSR may be provided for sending offset change information. Application-based and access stratum (AS)-calculated triggers for sending SPS configuration/offset change or activation/deactivation may be based on upper layer information. A logical channel prioritization (LCP) may be applied to an SPS grant based on association of logical channel and SPS configuration. A WTRU may select a single SPS grant in the case of simultaneously-occurring grants. An LTE adaptation layer for enabling/disabling the use of SPS, and providing timing, based on timing compensation, and interval information is disclosed.

As described herein, the term "WTRU" may represent a single D2D-enabled device, which may be an actual mobile device, a vehicle which has D2D communication capability, and/or a roadside unit meant to improve performance of the V2X system. A "WTRU" may further represent a mobile device communicating directly to an eNB. Similarly, the term "eNB" represents a traditional eNB employed in LTE infrastructure communication, and which may provide communication services for in-coverage D2D communications. The eNB may be deployed on a cellular tower, or could itself be deployed as a road-side unit, where, in the latter case, the eNB may have functionality limited to only D2D communication.

As further described herein, reference is made to CAM messages which are specifically referencing V2V related application messages which are transmitted over an AS radio interface. In the described embodiments, CAM messages may represent any type of upper layer messages which a WTRU would need to transmit using SPS, either over uplink or sidelink. Such message may have the property of time criticality or delay sensitiveness. Such messages may further be considered to be periodic during the majority of time, or for a significant amount of time, with occasional changes in period, timing (offset), or message size.

Figure 2:
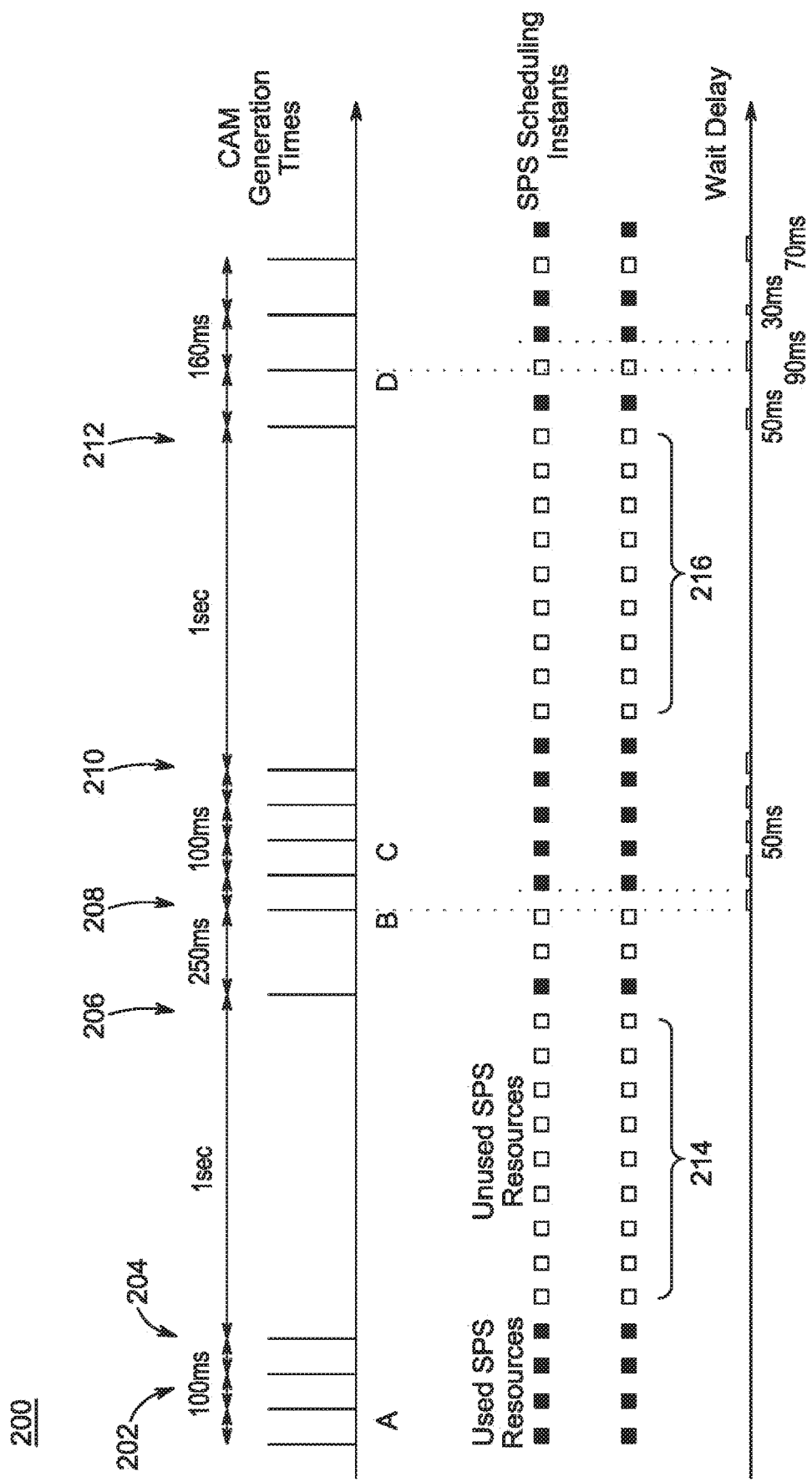
FIG. 2 is a diagram of an example timeline of CAM timing.

FIG. 2 illustrates a diagram of an example timeline of CAM timing 200. In view of the example timeline shown in FIG. 2, potential problems may become apparent related to using a fixed (e.g., 100 ms) period 202 for SPS in the case of a highly plausible high traffic scenario for a vehicle. In this example, the vehicle performs the following actions identified by the following exemplary timeline.

After a period of time where the vehicle satisfies a first condition, for example a speed, position or heading change, the vehicle stops satisfying condition 1, for example, the vehicle comes to a stop 204. The vehicle again starts to satisfy condition 1, when it starts moving again 206. The vehicle may begin to slow down 208. The vehicle stops satisfying condition 1, it comes to a stop 210. The vehicle again, after 160 ms following the last CAM, starts to satisfy condition 1, for example, it starts moving again but only very temporarily 212. The CAMs then become spaced by 160 ms for 3 intervals until they move back to occur at a 1 second interval.

Accordingly, the resulting timing of CAMs using an SPS configuration at a period of 100 ms is shown in the timeline 200. This configuration may result in potentially large amounts of SPS resources which are unused by the WTRU 214 216, for which the scheduler cannot reuse. While resources may be implicitly released after a number of empty transmissions by the WTRU, frequent transitions between the two states may still cause some resource wastage, and the WTRU may still need to communicate with the eNB to re-allocate the resources. In addition, potentially large wait delays (ranging from 30 ms to 90 ms) may result under this configuration. These large wait delays would need to be added to the overall E-UTRAN latency for the V2X messages, and will likely result in missing the 100 ms requirement.

It will be appreciated that, although the aforementioned problems are described in reference to CAM messages, the problems may occur for other types of application related traffic such as VoIP, realtime control, etc. As a result, the embodiments disclosed herein may apply not only for the V2V use case, but for any use case in which the traffic exhibits properties similar to CAM.

An SPS configuration is described in which a WTRU may request use of SPS and/or a SPS configuration is provided by the eNB. For example, a WTRU may request the use of SPS from the eNB. Such a request may be sent by the WTRU via RRC signaling. For instance, a WTRU requesting SPS from the eNB may do so using a WTRUSidelinkInformation RRC message. The WTRU may send the request for use of SPS as a result of a trigger from the upper layers, in one embodiment using an adaptation layer described herein.

The WTRU may include one or more information elements related to the parameters of the SPS in the request for SPS configuration. For example, the WTRU may include information related to one or more desired SPS configurations, each including one or more of a periodicity and/or offset of the SPS configuration, size of transmission (e.g., transport block size (TBS)), number of resource blocks RBs, etc. In another example, the WTRU may include information related to the desired parameters of one or more requested SPS configurations in a form of a set of indices each pointing to a row in a pre-configured table, where each row in the table lists a set of desired SPS parameters for that desired SPS configuration.

In response to the SPS request from the WTRU, the eNB may transmit an SPS configuration to the WTRU. Alternatively, the eNB may transmit an SPS configuration to the WTRU without an SPS request and may, thus, transmit the SPS configuration autonomously or by some other trigger.

For transmission of messages over Uu, the WTRU may utilize the existing uplink SPS in LTE. In addition, a similar SPS configuration may be configured for sidelink SPS, and the sidelink SPS configuration may be sent via RRC messaging, or the combination of RRC messaging with a MAC control element (CE), and PHY messaging on PDCCH. The uplink or sidelink SPS configuration may further contain a configuration (e.g., configuration information) of WTRU assistance information and/or a sidelink configuration.

The WTRU assistance information includes information sent by the WTRU to the eNB to assist the eNB in adjusting the SPS parameters. Various types of configuration information with respect to the WTRU assistance information are possible. The WTRU may receive the configuration of WTRU assistance information related to whether assistance information may be provided to the eNB related to the SPS schedule, and what type of assistance information may be provided (e.g., timing, period), and how to send that information. The configuration of WTRU assistance information may allow or disallow the WTRU to transmit SPS scheduling assistance information. The WTRU may receive a list of possible timing offsets for the SPS resource pattern, where the offset may be defined relative to a specific SFN/subframe number, and/or relative to the start of the scheduling period. The WTRU may receive a list of possible SPS periods/intervals which it may select from or request change to. The list of possible SPS periods/intervals may be a subset of the possible SPS periods the WTRU may support or which the eNB could configure or assign to a given WTRU. The WTRU may potentially only request a change to one of the eNB configured list of periodicities. The WTRU may receive the configuration of resource (e.g., an UL) used to send the assistance information. For example, the assistance information may be sent using dedicated SR resources configured by the eNB specifically for this purpose. The WTRU may receive the allowable time instances and frequency with which assistance may be sent. For example, the WTRU may be configured to provide assistance at the end of each scheduling period, or periodically, based on a period configured by the eNB.

For a sidelink, an SPS configuration of the subframes in each scheduling period which correspond to the SPS resource may be provided. Such subframes may be the same in each scheduling period, and may further define the subframes for retransmission of data transmitted using SPS, as well as the number of required retransmissions The WTRU may receive, in an SPS configuration, a list of possible SPS resource configurations which may be enabled. This list may be implemented using a set of indices pointing to a predefined lookup table. The WTRU may activate one of the possible SPS configurations from the list. Alternatively, the WTRU may have multiple SPS configurations active simultaneously.

Resource configuration of the SPS configuration, or each configuration in the list of SPS configuration, may be provided. For example, each SPS configuration may correspond to a specific pattern of SPS resources with a periodicity (i.e., interval), timing offset, allocation size, actual resources used (resource blocks) or pattern of allocation size. A pattern of allocation size may be defined such that 1 in a specific number of SPS resources has a different (i.e., an increase or decrease) in the amount of resources relative to the SPS allocation size. For sidelink SPS, the resource configuration may be configured as in the case of uplink SPS, where the interval/period is configured in RRC, and the timing/offset and resource configuration may be indicated to the WTRU by the eNB, for example, by PHY layer signaling. In case of sidelink, the PHY layer signaling could be PDCCH with DCI format 5, sent using an SPS C-RNTI configured at the RRC layer. Alternatively, for sidelink SPS, the resource configuration may all be sent in RRC messaging (e.g., the interval, offset, and allocation size and/or allocation pattern may be sent via RRC messaging).

An SPS configuration may further include identification of the data that the WTRU should transmit or prioritize when using each specific SPS configuration, which could be in the form of an allowable logical channel, logical channel group, priority (e.g. ProSe Per-Packet Priority (PPPP)), radio bearer, application ID, QCI, or similar. For instance, the WTRU may be configured with multiple SPS configurations, and each SPS configuration should be utilized for transmission of data for a specific logical channel or logical channel group An SPS configuration may further include an identification of the sidelink destination ID(s) for which the SPS configuration applies to.

An SPS timing change is provided. A WTRU which sends a requested offset or an offset change for SPS is provided. As shown in the timeline shown in FIG. 2, in order to avoid an additional delay for delivery of CAM messages associated with waiting for the next SPS resource to transmit the pending CAM, the CAM message generation should be aligned to the SPS resource timing. Under the assumption of the same interval for both CAM and SPS, the wait delay will be zero.

However, the SPS offset configured by the eNB (i.e., the timing of the PDCCH grant with SPS C-RNTI in the case if UL SPS) is entirely decided by the eNB, so this cannot be guaranteed using current SPS mechanisms.

In one example, a WTRU may send the desired starting subframe (i.e., the offset) for the SPS resources to the eNB to allow the eNB to trigger SPS resource allocation/reallocation so it is aligned to CAM message generation. Specifically, a WTRU may send a time offset, for example, in the form of a system frame number (SFN) number and/or subframe index, to the eNB which indicates the time in which it expects to (start) have an SPS resource available. The time offset (or "offset") may also be sent implicitly to the eNB by assuming the SFN and/or subframe to be a fixed predefined number of subframes following the transmission of a signal by the WTRU to the eNB.

Alternatively, the WTRU may indicate to the eNB to delay or shift the current offset of the SPS by a certain amount in time. For instance, the WTRU may already be configured with an SPS configuration and a specific time offset or starting point for the resources for that SPS configuration. The WTRU may indicate to the eNB to shift, delay, advance the timing or starting point for that SPS configuration by a certain number of subframes relative to the current timing of the resources.

The WTRU may be configured with multiple timing options. For example, in order to reduce the signaling associated with the requested offset change by the eNB, the WTRU may be further configured with a set of possible timing offsets by the eNB, where one specific timing offset may be active at a given time, and the WTRU may request an alternate timing offset in a requested offset change message.

The WTRU may receive multiple possible offsets in an RRC message configuring the SPS. These offsets may be indicated as an offset from a specific SFN/subframe, either defined or provided in the same configuration, or as an offset from the initial resource configuration in the PDCCH message indicated by SPS C-RNTI which may allocate the SPS resources for the configuration the first time.

The WTRU may further receive, or associated with, an index to each of the possible offsets in the RRC message.

When sending the requested offset change to the eNB, the WTRU may indicate the desired offset it wishes to use by indicating the index associated with one of the configured offsets.

Figures 3A, 3B:
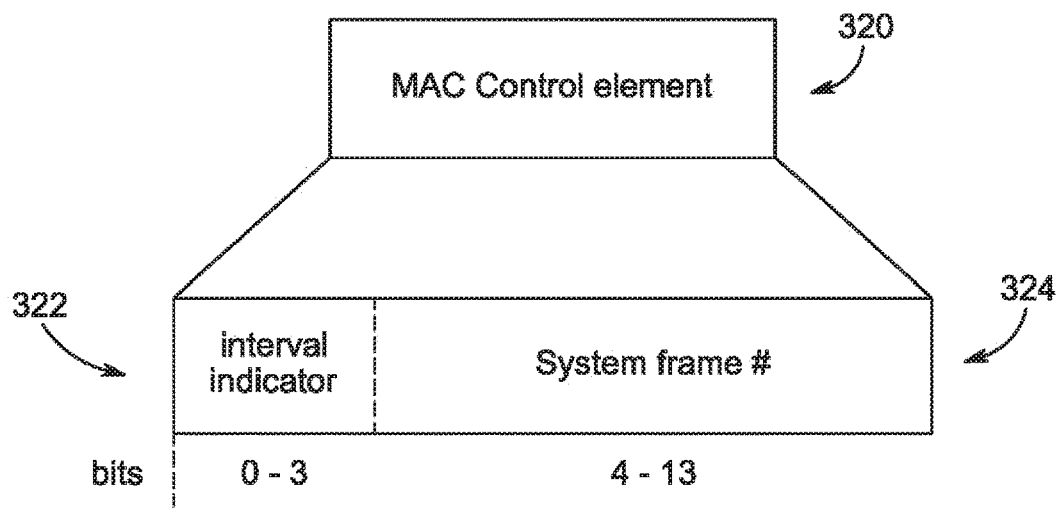
FIG. 3A is a diagram of an example 4-bit interval value indicator used to signal one of 10 or more desired pre-configured SPS intervals.
FIG. 3B is an illustration of an exemplary MAC control element (CE) design comprising an interval indicator value and a system frame number (SFN)

FIG. 3A discloses the use of a 4 bit interval value indicator 300. With four bits, a value 302 may represent an interval size. Up to 16 different intervals are shown in this example, assuming four bits. Here, value 0000 304 corresponds to a minimum interval of 100 milliseconds 306. The maximum value shown, 1001 308, corresponds to a long interval of 1 second 310. FIG. 3B illustrates an exemplary MAC control element 320 comprised of the 4 bit interval indicator 322 and a 10 bit system frame number 324 used as an offset. The 10 bit system frame number may be made smaller by using a SFN offset from a current SFN instead of 0.

Different types of information may be provided in the request for offset or offset change message. The request for offset or change in offset may contain any of: SFN and/or subframe offset of the SPS (i.e., timing of one of the SPS resources), required time shift (positive or negative, and potentially in terms of frames, subframes, or some unit of subframes such as scheduling periods) of the SPS resource pattern relative to the current time pattern, index identifying one of several possible timing offsets for the SPS resource pattern (potentially configured by the eNB, or predetermined), and identification of the SPS process (if multiple are configured) for which the timing needs to be changed.

A SFN and/or subframe offset of the SPS, for example, a timing of one of the SPS resources, may be represented by any of the following: the absolute SFN and subframe of the first SPS resource with the other resources separated by the configured SPS period, the offset from a predefined fixed subframe (e.g. SFN 0 (mod x) and subframe 0), the offset from the start of the scheduling period associated with a sidelink resource pool, any/or the offset from the original transmission by the eNB of PDCCH with SPS C-RNTI, PDCCH with DCI format 5, or any similar PDCCH message used by the eNB to initiate the SPS resource allocation following its configuration.

With respect to an index identifying one of several possible timing offsets for the SPS resource pattern, potentially configured by the eNB, or predetermined, the eNB may send, in the SPS configuration, a set of indexed allowable offsets, and the WTRU may provide the offset change by providing the index that corresponds to the desired offset.

With respect to an identification of the SPS process (if multiple are configured) for which the timing needs to be changed, such identification may be made by sending an index which references the index provided by the eNB in the configuration of the multiple SPSs. Such identification may also be made by sending an index which corresponds to the order of the SPS grants relative to a specific frame/subframe combination (e.g. SFN x mod y, subframe 0).

Such information pertaining to a request for offset or change in offset is further referred to as offset change information.

The WTRU may send such a request for offset or change in offset using one or more of the following. A request for offset may be provided in an RRC message containing the offset change information, which may come following the RRCRadioResourceConfiguration message which configures the SPS in the WTRU, or at any time following connection of the WTRU to the eNB. A request for offset may be provided in a MAC control element (CE) containing the offset change information.

A request for offset may be provided in a BSR containing the offset change information. Specifically, a WTRU may trigger a BSR when it determines that the timing of SPS allocations requires a change. The BSR may be a sidelink BSR in the case the SPS resources and transmissions are on PC5 rather than on the UL. Offset change information may be included in the BSR or sidelink BSR.

For example, the BSR or sidelink BSR may include, in a new field, the SFN and subframe, time shift, or SPS configuration index for the SPS configuration. Such information may be further associated with a logical channel group for which the WTRU may utilize the said SPS configuration to transmit data. Information may be in the form of one or more additional field to the buffer size associated with the logical channel group.

The BSR or sidelink BSR may include the SFN, subframe, time shift may be sent in the place of the buffer size for a specific logical channel group. The WTRU may utilize a special destination index field, logical channel group, or combination of the two, to indicate that the corresponding buffer size fields indicates SPS timing information instead.

The BSR or sidelink BSR may contain a special flag which indicates that a change in SPS timing is requested as a result of transmission of the BSR. The requested new timing of the SPS configuration may be indicated by the time instance in which WTRU sends the BSR. For instance, the WTRU may indicate that the new offset or timing of SPS correspond to a number of subframes (possibly 0) following the subframe where the BSR was transmitted.

The BSR or sidelink BSR may contain the index which is associated with one of the pre-defined or allowable timing offsets for the SPS pattern.

A request for offset may be provided in a physical (PHY) layer message, such as, but not limited to, a scheduling request (SR), Physical Uplink Control Channel (PUCCH), sounding reference signal (SRS), or Random Access Procedure (RACH). For example, a special dedicated SR resource may be allocated to the WTRU for sending the desired SPS offset. Different SRs may be configured in the case where multiple SPS configurations are present. The actual SFN and offset for the start of the SPS resource could be understood to occur a certain number of subframes following the subframe in which the special SR was transmitted by the WTRU, for example, in the same subframe, or after a predefined number of subframes, known by both the WTRU and the eNB.

The WTRU may transmit the requested offset message at any time during operation in order to change the offset of the current SPS resources. For example, as a result of one of the transitions shown in the timeline shown in FIG. 2, which may change the offset between SPS and CAM, but where the intervals for both remain the same, the WTRU may transmit the requested offset message to the eNB. More detailed triggers for the WTRU transmitting the requested offset message are further described below.

The WTRU receives a timing change confirmation from the eNB. In particular, following transmission of the requested offset message, the WTRU may receive a confirmation of timing change confirmation from the eNB which may provide the new timing for the SPS configuration. Such confirmation may be received using any of the following: PDCCH message, MAC CE message or RRC message.

With respect to the PDCCH message, the timing change confirmation may be indicated with an SPS C-RNTI which identifies the SPS configuration as well as the new timing of the SPS resources. In the case of multiple SPS configurations, each SPS configuration may be represented by a separate SPS C-RNTI.

Figure 4:
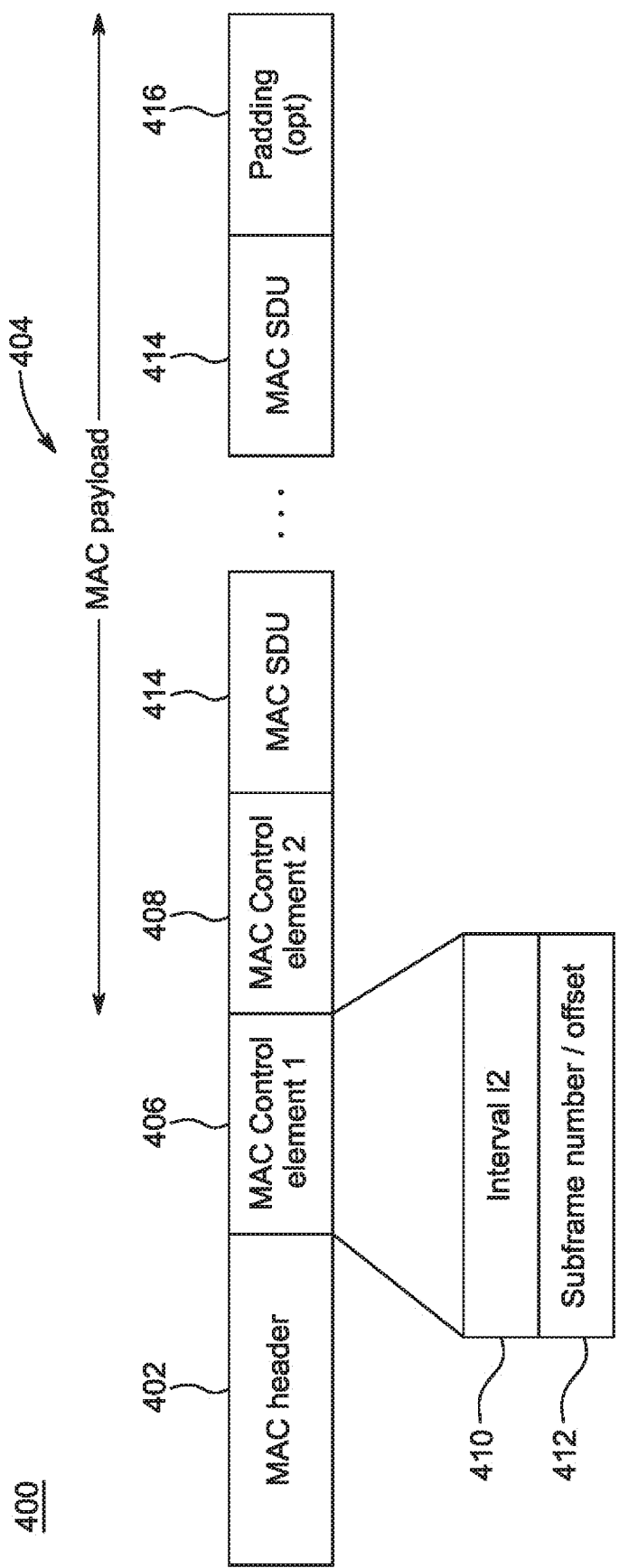
FIG. 4 is an illustration of an exemplary MAC PDU comprising a plurality of MAC CEs.

FIG. 4 is an illustration of an exemplary MAC header 402 and MAC payload 404 which comprise a plurality of MAC CE messages 406, 408. With respect to one or more of the MAC CE messages 406, 408, the timing change confirmation may be indicated by the message containing the new timing, using for example a SFN and/or subframe offset, and identification of the SPS configuration, denoted herein by interval I2. Subframe number 412 may be included in a MAC CE. Mac Payload 404 may additionally comprise one or more MAC SDU 414 and padding 416.

With respect to the RRC message, the timing change confirmation may be indicated by the message containing the new timing (SFN and/or subframe offset) and identification of the SPS configuration.

The WTRU may apply/assume/infer the new timing of resources upon reception of the timing change confirmation from the eNB. The WTRU may further assume the new timing to be that provided in the requested offset message (if the eNB does not provide a timing), or it may assume the new timing to be the timing provided in the timing change confirmation from the eNB.

The WTRU may receive the confirmation from the eNB using PDCCH or MAC CE. In this case, the WTRU may assume the existing RRC configuration of SPS is maintained and the change of timing is simply applied using the information in the confirmation message. In the case the WTRU receives the confirmation using RRC, the confirmation may further provide a new configuration of the SPS. The WTRU may then update its RRC configuration with the configuration provided in the confirmation message.

For example, following the transmission of the requested offset message, the WTRU may receive a corresponding PDCCH using SPS C-RNTI in order to signal the change in the SPS timing with the new offset. The WTRU may assume that the previous SPS timing of resources (with the old offset) persists until it receives the PDCCH with SPS C-RNTI (which should occur at the offset it requested).

Figure 5:
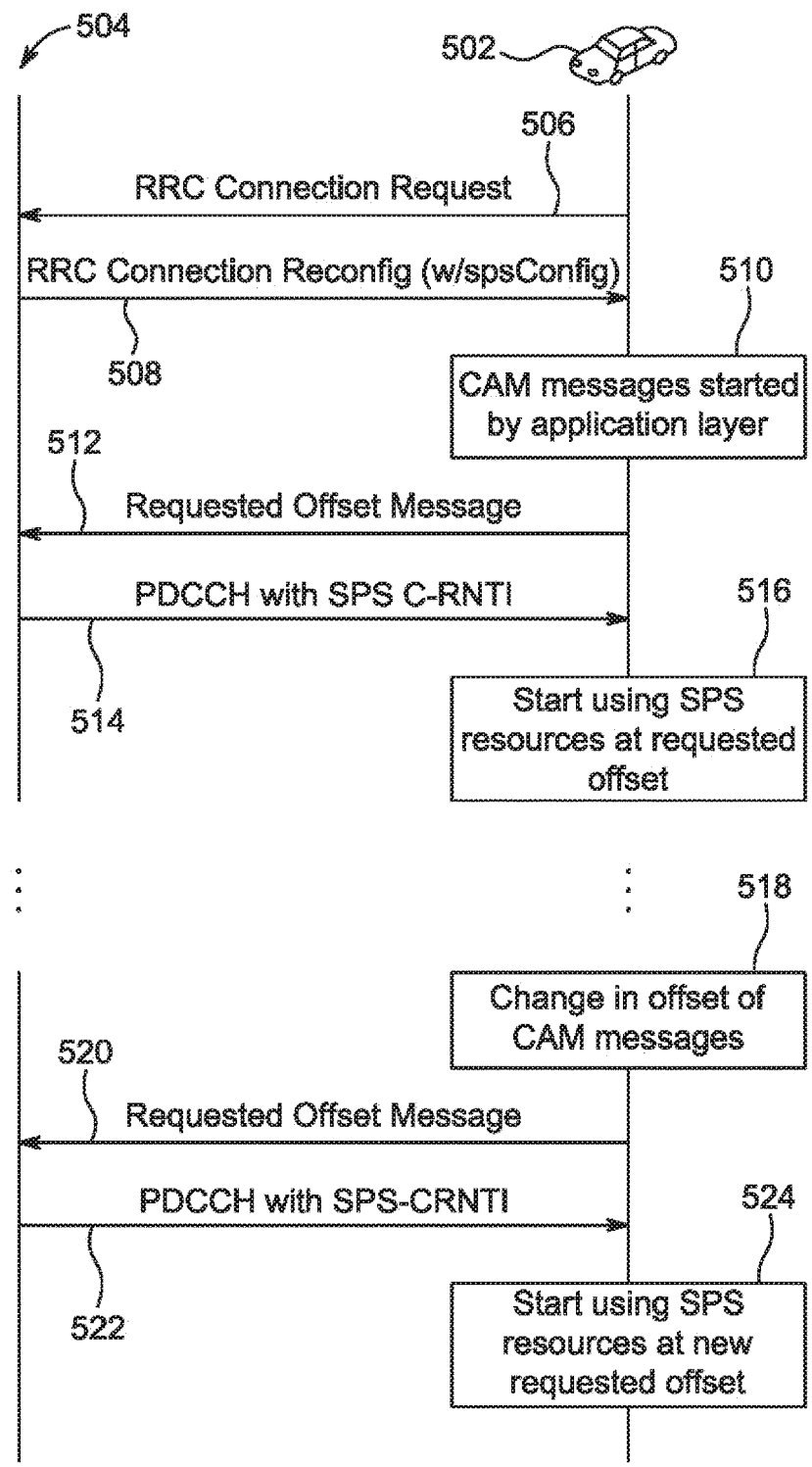
FIG. 5 is a diagram an example procedure of a requested offset or offset change.

FIG. 5 shows an example of a timing of messaging 500 in accordance with requesting an offset or offset change in which the WTRU sends the requested offset or offset change for SPS. A vehicle or WTRU 502 may transmit an RRC connection request 506 to an eNB 502. The WTRU 502 may receive an RRC connection reconfiguration message 508 in response. The RRC connection reconfiguration message may include a spsConfig. Cam messages may be started by an application layer 510. The WTRU 502 may transmit an offset request message 512. The WTRU may receive, on the PDCCH, an SPS C-RNTI 514. The WTRU may start using SPS resources at the requested offset 516. If a change in offset of CAM messages 518 is determined by application or otherwise, the WTRU 502 may transmit an offset another request message 520. Upon receiving a PDCCH with an SPS C-RNTI 522, the WTRU may start using SPS resources at a newly requested offset 524.

WTRU triggers for sending an offset or offset change to the eNB are provided. Based on any of the information provided by the upper layers defined below (e.g., upper layer indication of timing of message arrival, indication of a change in periodicity, indication of timing change, message tagged by upper layers, information based on WTRU providing timing to upper layers, and information related to vehicle dynamics changes) the WTRU may determine the need to send an offset change to the eNB based on one or more of the following triggers.

A trigger may be when a timing change indication is received from the upper layers.

A trigger may be indicated by the timing of the message arrivals from upper layers, possibly associated with a specific PPPP or QCI, or the message arrival to a specific radio bearer, logical channel, or the like, satisfy one of the following conditions.

A trigger may incur when the time between the reception of the upper layer indication and the subsequent next SPS resource scheduled exceeds a certain threshold Ta, or is smaller than a certain threshold Tb. The threshold Tb may correspond to a processing latency assumed for the AS, and so the case of a time difference smaller than a threshold corresponds to having the processing latency required by the AS exceeding this difference.

A trigger may incur when the time difference between current and previous message arrival is different (e.g., by a configured amount) from previous Na intervals of the timing between message arrivals, or different (e.g., by a predefined configured amount) from a determined periodicity of the messages (such periodicity could be provided by the application layer or determined by the WTRU lower layers).

A trigger may incur when the timing of the message arrival becomes closer in time to another potential timing for the SPS resources (e.g., configured by the eNB).

A trigger may incur when the above described timing conditions occur consecutively a number (xNb) of times.

In the case the WTRU sends information of the desired offset or timing for the SPS, the WTRU may compute this information based on one or more of the following.

The WTRU may select the timing offset to coincide with any subframe which is at least Tc milliseconds following the CAM message timing (where Tc may be zero).

The WTRU may select the timing offset to coincide with a subset of allowable subframes or allowable timing, which is at least Td milliseconds following the CAM message timing, but minimizes the time difference between SPS resource and CAM message timing. The subset of allowable subframes may be configured by the eNB. For example, the subset of allowable subframes may consist of the allowable D2D subframes for the sidelink, as defined by the TRPT or D2D subframe pattern for the WTRU defined by the eNB, or by the WTRU's transmission pool on PC5. The WTRU may select one of the pre-configured timing offsets, preconfigured by the eNB, which minimizes the time difference between SPS resource and CAM message timing.

In another example, a WTRU may send an indication to change an SPS configuration to the network (e.g., an eNB) to change the period and/or scheduling interval of the SPS configuration. For example, a WTRU may send an indication to the eNB to request a change in the scheduling interval of the current SPS configuration. Specifically, the WTRU, upon trigger from upper layers (such as detection of the need to change the frequency of CAMs due to a change in vehicle dynamics), may inform the eNB of the need to change the SPS configuration (e.g., the scheduling interval and/or offset). The WTRU may assume the change in configuration may take effect as a result of this indication. Alternatively, the WTRU may receive a message from the eNB with a new SPS configuration, or confirming the change in configuration requested by the WTRU. The change in configuration may then take effect (i.e., the WTRU starts to use the new SPS configured resources) at any one of the following time instances: at the reception of the indication by the eNB (e.g., based on the WTRU receiving an acknowledgment (ACK) from the eNB, for example via a Physical Hybrid-ARQ Indicator Channel (PHICH)); at some future time instant indicated by the WTRU; at some future time instant that is statically defined (i.e. in WTRU specification) and which may be relative to the last SPS resource allocation, the time in which the eNB received the indication (e.g. as determined by the WTRU transmission time and/or reception of an ACK from the eNB over the PHICH), the time at which the WTRU transmitted the indication to the eNB, or a time instant explicitly provided in the indication; at the reception by the WTRU of a new SPS configuration by the eNB; and/or at the reception by the WTRU of a confirmation that the indication was received by the eNB. The confirmation that the indication was received by the eNB may be sent through one or more of the following: one or more RRC messages, such as an SPS release followed by a new SPS configuration; a PDCCH grant using the SPS C-RNTI associated with the configuration; a PDCCH using a new C-RNTI, or using a new downlink control information (DCI) format; and/or a new MAC CE.

Based on any of the information provided by the upper layers defined in section 4.1.5, the WTRU may determine the need to send an indication to change the SPS configuration. An indication to the eNB to change the SPS configuration may be sent by the WTRU as a result of a trigger.

A WTRU trigger for sending an SPS configuration change is provided. For example, based on any of the information provided by the upper layers defined below (e.g., upper layer indication of timing of message arrival, indication of a change in periodicity, indication of timing change, message tagged by upper layers, information based on WTRU providing timing to upper layers, and information related to vehicle dynamics changes) the WTRU may determine the need to send an indication to change the SPS configuration based on any of the following triggers.

A trigger may be incurred by a determination, by the AS, an adaptation layer described below, or an application layer, that the period of CAM messages has changed. Such determination, whether performed by the AS or the adaptation layer, may follow the rules defined below for the adaptation layer for managing SPS for CAM messages described below, and may be based on information provided by the upper layers.

A trigger may be incurred from the AS or from the V2X application layer running on the WTRU before, during, or following generation of a CAM which is being sent with a CAM interval different than the previous interval.

The AS in the WTRU or the eNB itself may trigger an indication to the eNB, upon determination that the CAM interval has changed (e.g., either a CAM message was received with an interval smaller than the previous interval, or a CAM message was not received at the expected time relative to the last interval).

Number of upcoming intervals in which the CAM interval is expected to remain the same (and its corresponding value) may trigger an indication to the eNB.

An indication that the CAM interval has changed to its maximum value (1 sec) may trigger an indication to the eNB.

The WTRU may send, as part of the triggered indication to the eNB, one or more of the following information: a new scheduling interval requested for the SPS configuration; a subframe on which the SPS resources with the new scheduling interval should start (i.e., the offset); a required resource size for the SPS resources; an index identifying one of several possible timing offsets for the SPS resource pattern; and/or identification of the SPS process (e.g., if multiple processes are configured) for which the timing needs to be changed.

With respect to the new scheduling interval requested for the SPS configuration. The WTRU may provide the eNB with one of the possible SPS periodicities that was initially configured by the eNB. Alternatively, the WTRU may provide the eNB with any periodicity supported for SPS (pre-defined or standardized).

With respect to the index identifying one of several possible timing offsets for the SPS resource pattern (potentially configured by the eNB, or predetermined), the eNB may send, in the SPS configuration, a set of indexed allowable offsets, and the WTRU may provide the offset change by providing the index that corresponds to the desired offset.

With respect to the identification of the SPS process (e.g., if multiple are configured) for which the timing needs to be changed, such identification may be made by sending an index which references the index provided by the eNB in the configuration of the multiple SPSs. Alternatively, such identification may be made by sending an index which corresponds to the order of the SPS grants relative to a specific frame/subframe combination (e.g. SFN x mod y, subframe 0).

The indication may be sent by the WTRU to the eNB using one of the following methods: a new MAC CE; a new special BSR that may hold the information given above; an SR, potentially sent on a resource that is predefined to inform the eNB of this event, following by transmission of the above information using a BSR or MAC CE; a PUCCH, potentially sent on a resource that is predefined to inform the eNB of this event; a new MAC CE, but sent in the SPS resource itself; a RACH or similar transmission by the WTRU performed at the next available RACH resource; or an RRC message.

Following the transmission of the indication to the eNB, the WTRU may continue to use the existing SPS configuration for transmission of CAMs until it receives the confirmation from the eNB. Alternatively, if a confirmation is not expected, the WTRU may change the SPS resources to use for CAM transmission to the new configuration at any of the starting time instances described above (i.e., the SPS changes implicitly based on sending the indication).

Figure 6:
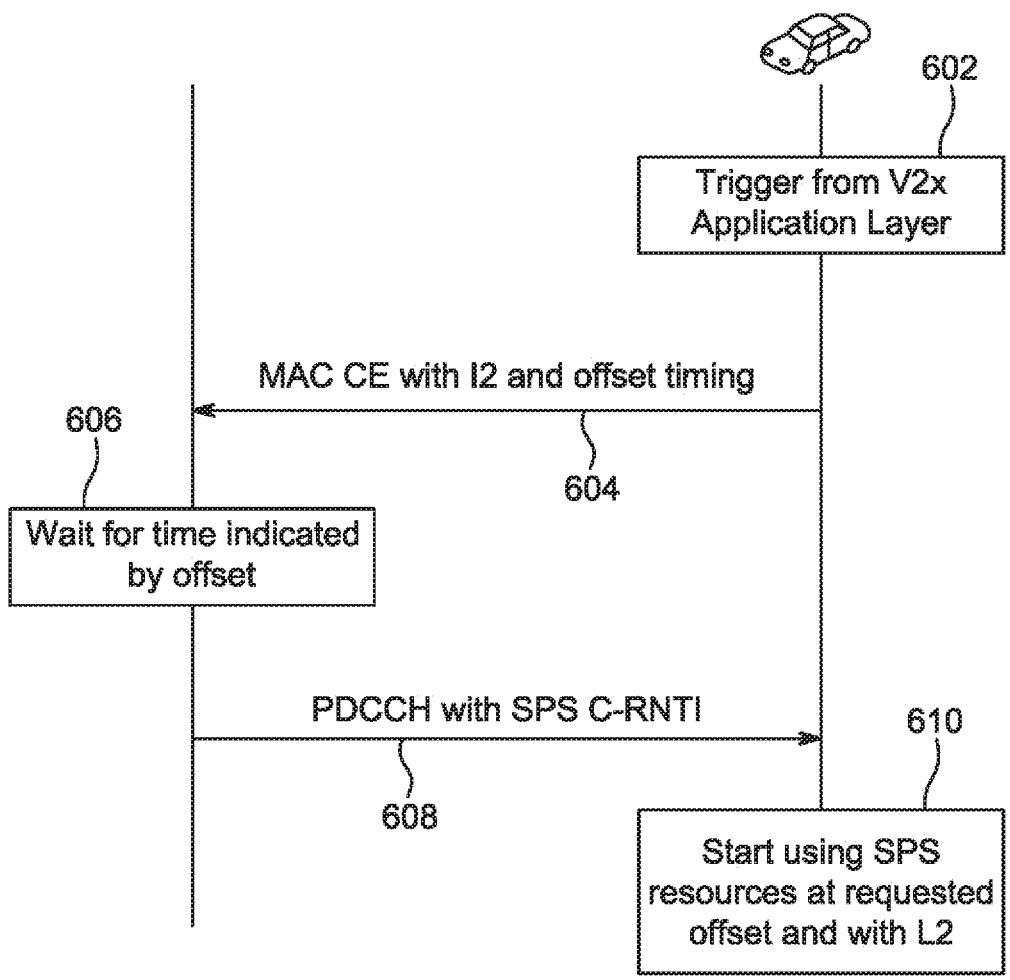
FIG. 6 is a diagram an example procedure of a SPS configuration change indication.

FIG. 6 is a messaging flow diagram for an exemplary embodiment. In FIG. 6, the WTRU Access Stratum may receive a message from the application layer 602 when either trigger condition (1) or (2) described below occurs. According to condition (1), a time elapsed since the last CAM generation is equal to or greater than T_GenCam_Dcc and one of the following ITS-S dynamics related conditions is given: the absolute difference between the current heading of the originating ITS-S and the heading included in the CAM previously transmitted by the originating ITS-S exceeds 4°; the distance between the current position of the originating ITS-S and the position included in the CAM previously transmitted by the originating ITS-S exceeds 4 m; or the absolute difference between the current speed of the originating ITS-S and the speed included in the CAM previously transmitted by the originating ITS-S exceeds 0.5 m/s. Here, T_GenCam_Dcc provides the minimum time interval between two consecutive CAM generations in order to reduce the CAM generation according to the channel usage requirements of Decentralized Congestion Control (DCC). According to condition (2) a time elapsed since the last CAM generation is equal to or greater than T_GenCam and equal to or greater than T_GenCam_Dcc. Here, T_GenCam represents the current valid upper limit of the CAM generation interval.

A trigger from the application or entity managing vehicle dynamics that the speed, direction, or position has changed from a state where trigger condition (1) above is valid to a state where condition (1) is not valid.

The WTRU Access Stratum, upon determination that the SPS interval needs to change from interval I1 to interval I2 (e.g., upon receipt of a message from the application layer when either trigger condition (1) or (2) occurs), may send a MAC CE 604 to the eNB containing I2, as well as the subframe in which the RAN expects to be able to send the next CAM message (i.e., the new offset timing). Subsequently, the WTRU may be scheduled with dynamic scheduled resources, or may send a SR to trigger scheduling of such dynamic resources, and may send any pending CAM messages using the dynamically scheduled resources. At some time following the indication using MAC CE, the WTRU Access Stratum may be scheduled on PDCCH using the SPS C-RNTI. Upon reception of this scheduling on PDCCH, the WTRU may assume the SPS configuration to be changed, and the scheduling interval to be 12 for this SPS. The WTRU may also change the corresponding configuration element in RRC accordingly.

Figure 7:
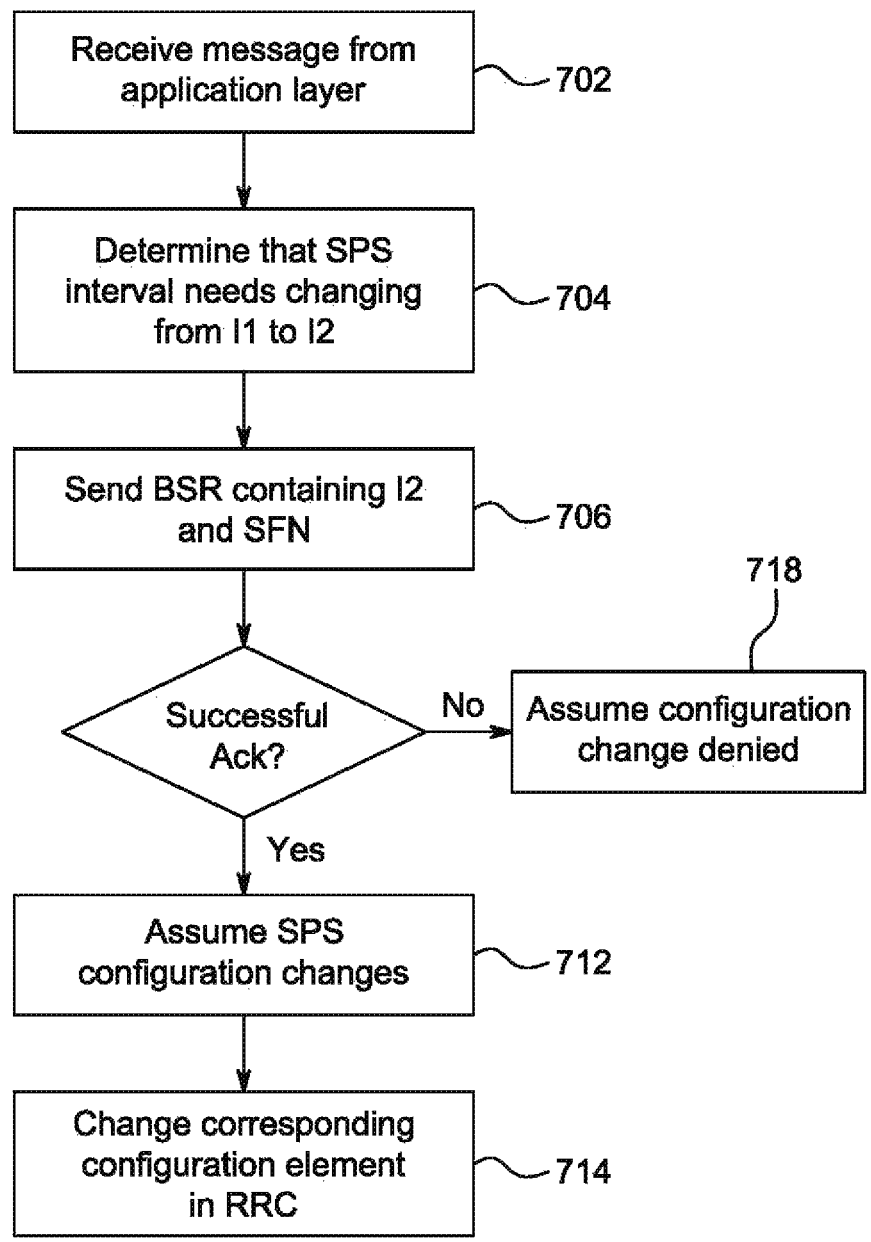
FIG. 7 is a flowchart which illustrates a method for shortened SPS reconfiguration using an acknowledgement message.

FIG. 7 illustrates an example embodiment which may shorten time required for an eNB to signal SPS change. The WTRU Access Stratum may receive a message from the application layer 702 when either when a trigger condition occurs, for example either condition (1) or (2) described above occurs. The WTRU Access Stratum, upon determination that the SPS interval needs to change from interval I1 to interval I2 704, may send a new special BSR 706 which contains interval I2 and the subframe in which the Access Stratum expects to be able to send the next CAM message (i.e., new offset timing). Upon reception of the ACK associated with the MAC protocol data unit (PDU) in which the special BSR is transmitted, the WTRU may assume that the SPS configuration has changed according to the request. The WTRU may also change the corresponding configuration element in RRC accordingly.

In another example embodiment, the WTRU Access Stratum may receive a message from the application layer or upper layers indicating that the periodicity of CAM messages has changed, for example, from 1 second to 200 ms. The WTRU Access Stratum, upon reception of this information, may send a MAC CE containing the identification of the SPS configuration whose period should change, as well as the new required period for the SPS configuration. The WTRU may continue to assume the current configuration of the SPS until it receives a new SPS configuration (e.g., by RRC messaging) from the eNB. The WTRU may cancel the current SPS configuration upon receipt of the new SPS configuration, and only enable the new SPS configuration following receipt of a PDCCH message (e.g., DCI format 5 for sidelink) encoded with SPS C-RNTI associated with the new SPS configuration.

The WTRU may also send an indication, message and/or notification to release specific resources (e.g., a subset of SPS resources). For example, a WTRU may send a message to the eNB to release a specific set of SPS resources associated to an SPS configuration, but not release the entire configuration. For instance, the WTRU may indicate that it does not need (does not plan to use) the SPS resources associated with the next X SPS scheduling intervals. This would allow the eNB to schedule these resources to other WTRUs. Following the X scheduling intervals, the WTRU may then assume that it again has access to the SPS resources as per the existing SPS configuration.

The WTRU may send the indication to release the specific resources using one of the following methods: a new MAC CE; a new special BSR that may hold the information given above; an SR, potentially sent on a resource that is predefined to inform the eNB of this event, following by transmission of the above information using a BSR or MAC C; a PUCCH, potentially sent on a resource that is predefined to inform the eNB of this event; a new MAC CE, but sent in the SPS resource itself; a RACH or similar transmission by the WTRU performed at the next available RACH resource; or an RRC message.

Multiple SPS configurations are provided. In particular, multiple SPS configurations and activation/deactivation of configurations are provided, the activation and deactivation of which may be performed dynamically on a real-time basis according to conditions and trigger events. For example, a WTRU may be configured with multiple SPS configurations, but may only have one configuration active at a given time. A WTRU may then request to change (cycle) between one configuration and one or more other configurations by de-activating the current active configuration, and activating another configuration.

The WTRU may receive the multiple configurations along with the RRC Connection reconfiguration message from the eNB. The WTRU may receive from the eNB, the active configuration of the provided configurations. Alternatively, the WTRU may be required to assume that none of the configurations be active, and instead indicate to the eNB at a later time which configuration to activate. The WTRU may send, in an SPS activation/deactivation message, to the eNB an identifier associated with the SPS configuration to activate or deactivate the corresponding SPS configuration.

The WTRU may send a configuration activation/deactivation message or indicator using one of the following methods: a new MAC CE; a new special BSR that indicate the configuration to activate/deactivate; an SR, potentially sent on a resource that is predefined to inform the eNB of this event; a PUCCH, potentially sent on a resource that is predefined to inform the eNB of this event, and potentially where the specific PUCCH resource selected by the WTRU may also indicate the SPS configuration to activate or deactivate; a RACH or similar transmission by the WTRU performed at the next available RACH resource; an RRC message; or an SRS like message, where the location of the SRS resource may potentially also indicate the SPS configuration to activate or deactivate. Furthermore, the position of the SR may also indicate which SPS configuration to activate/deactivate.

A WTRU may consider the requested configuration activated upon transmission of the activation/deactivation message. Alternatively, the WTRU may consider the requested configuration activated upon acknowledgement by the eNB, either through: a hybrid automatic repeat request (HARQ) ACK to the MAC PDU carrying the MAC CE, an explicit RRC message, or a PHY layer message, such as PDCCH message (e.g., PDCCH with SPS C-RNTI).

In an embodiment, the WTRU may send a new MAC CE to activate one SPS configuration while deactivating the other configurations. The activation may take effect at the subframe in which the WTRU receives an SPS C-RNTI from the eNB.

A WTRU may potentially use the above mechanisms to disable all SPS configurations based on triggers from upper layers. For example, a WTRU may receive (e.g., from the adaptation layer) an indication to not use SPS.

Triggers for requesting a change in SPS Configuration include: an application layer, adaptation layer, or upper layers indicates when the period of traffic has changed (e.g., from 1 sec to 100 ms, or vice versa); application layer, adaptation layer, or upper layers indicates that the timing (offset) has changed, what the new offset is, and that the timing changed by a certain amount (e.g., larger than a threshold); and the WTRU determines that one configuration may be better than another based on information provided by the application layer, adaptation layer, or upper layers.

FIG. 8 illustrates a number of application level trigger events with respect to V2X communications. For example, an autonomous mode change may be detected when a vehicle switches from a human driver to an electronic drive control 802. It may be desirable for a WTRU to be allocated a higher (or lower) SPS periodicity so that an autonomous vehicle may be allocated more system bandwidth in order to transmit/receive information accordingly. The same may be true with an Under 18 Driver indication 804. Another exemplary trigger event includes a system capability change which may be related to software or firmware upgrades of a vehicle or WTRU. In some cases, software updates may be frequent. Addition of new software or applications may also cause a change in system capability.

Logical channel prioritization applied to SPS grant is provided. In particular, a WTRU, when transmitting using a grant associated with a given SPS configuration, may select data from logical channels to be transmitted using that grant. The selection of data from the logical channels to be transmitted may be based on using a combination of following criteria which may be prioritized in any order: transmit data with the highest priority, based on PPPP; transmit data with decreasing priority of PPPP; transmit data whose periodicity matches, is less than, or greater than the periodicity of the SPS configuration associated with the grant; transmit data whose size matches, is less than, or greater than the grant size of the SPS configuration associated with the grant; transmit data based on a configured mapping between the higher layer data/service or logical channel, and the SPS configuration; delay transmission of data until a grant for the associated SPS configuration is received; and amount of time until the next grant associated with a specific SPS configuration. Such selection may apply whether the WTRU has multiple SPS configurations active simultaneously, or a single active SPS configuration.

In one example, a WTRU may select the SPS resource to utilize for transmission of data coming from higher layers based on the SPS configuration from the eNB. A WTRU may receive an SPS configuration that is associated with one or more logical channels, logical channel groups, radio bearers, PPPP, QCI, or the like.

The WTRU may transmit only data from the one or more logical channel, or the like, using the SPS grants for the SPS configuration associated with the logical channels.

Alternatively, the WTRU may first transmit all data from the associated logical channels, and then transmit any remaining data (from potentially other logical channels not associated with SPS configuration) if the grant allows for transmission of additional data, but all data in the buffers for the associated logical channels may be transmitted using the grant.

In addition, the WTRU may first transmit all data with priority (e.g. PPPP, or logical channel group (LCG) priority (i.e., LCP)) which is higher than the configured logical channel associated with the SPS configuration before transmitting any data from the configured logical channel. Alternatively, the WTRU may first consider all data associated with an SPS configuration before considering data with higher priority (e.g. PPPP, or LCG priority).

In another example, a WTRU may determine which SPS resource to utilize based on the configured periodicity and/or allocation size of the SPS resource as well as information from the application layer. In this case, the WTRU may determine the required transmission interval for a particular application layer packet, based on application layer information included with the packet. Such information could be in the form of a QCI-like parameter indicating the periodicity or timing requirements attached to the packet. It may also be provided to the WTRU in the form of a PPPP, where specific PPPPs may be used to indicate data with a specific transmission period (e.g. CAM traffic).

The WTRU, when selecting the data to be transmitted on an SPS resource may identify the periodicity associated with the SPS configuration associated with the specific SPS resource; select upper layer PDUs that require a matching periodicity for multiplexing into the MAC PDU to transmit; if all data from the matching periodicity has been included, select upper layer PDUs that require lower periodicity for the multiplexing into the MAC PDU to transmit; and, if all of the above has been included, select upper layer PDUs for any periodicity, or select upper layer PDUs not associated with any specific periodicity or timing requirement for the multiplexing into the MAC PDU to transmit.

In another example, the WTRU may defer selection of an RLC PDU for transmission until the occurrence of the grant from the associated (configured or based on WTRU-determined mapping) SPS configuration, and select that PDU only when that grant is received. In this case, a WTRU may, in selecting RLC PDUs for transmission of a MAC PDU, avoid selection of the RLC PDU from a logical channel (regardless of its priority) and select an RLC PDU from the next highest (in priority) logical channel for transmission. The WTRU may further avoid selection of the PDU under the condition that the time to the arrival of the next grant for the associated SPS configuration is less than some preconfigured threshold. Otherwise, the WTRU may be configured to transmit the packet using the legacy mechanism (e.g., using the current grant of via the legacy mechanism for requesting a grant).

Managing simultaneously-occurring SPS grants is provided. In particular, a WTRU may be configured with multiple active SPS configurations such that grants from the different SPS configurations occur simultaneously. This may consist of grants occurring on the same UL subframe (for UL SPS transmission) or on the same scheduling period (e.g., for sidelink (SL) SPS transmission). SL SPS refers to a SPS configured for Device-to-device (D2D) communication.

In one example, a WTRU configured with simultaneously occurring SPS grants may be required or expected to transmit using only one of the grants. This may be the case, for instance, if the eNB assumes that the WTRU will use only one of the configured grants, and allocate the UL resources for other WTRUs. The grant to be used by the WTRU may be selected according to any of the following criteria.

The grant which has the largest allocated resource, for example, in terms of resource blocks, may be selected. The grant for which the allocated resource size is closest to the size of data to be transmitted by the WTRU, for example, as transmitted in the BSR for the WTRU, may be selected. Potentially, in this scenario, the grant must additionally be larger than or equal to the amount of data to be transmitted by the WTRU, or indicated by the WTRU in the BSR. The grant with the best channel properties (for example, based on measurements made by the WTRU or by the eNB) may be selected. The grant for which the WTRU has detected, for example, through sensing, having the least interference from other transmitting WTRUs, or has the least overlap (in terms of resources) with the transmission resources selected by another WTRU for the same scheduling period may be selected.

In this example, a WTRU may further use the rules for logical channel prioritization (LCP) discussed above for selecting data to transmit on the configured and selected grant.

In another example, a WTRU configured with simultaneously-occurring SPS grants may be required or expected to transmit on all of the grants in the given scheduling period or UL subframe. In this case, the WTRU may further use the rules for LCP discussed above for selecting data to transmit on the simultaneously-occurring grants. The WTRU may also perform LCP in this case while following any of the rules below.

For example, the WTRU may consider the sum of the grant sizes of the simultaneously-occurring grants to be the available grant size for transmission of a MAC PDU, and perform LCP given the sum of the grant sizes. Additionally or alternatively, the WTRU may select the grant to use to transmit an RLC PDU such that the RLC PDU does not need to be segmented. Additionally or alternatively, the WTRU may consider each grant separately and apply the rules mentioned previously for LCP. For example, the WTRU may only select an RLC SDU from a logical channel associated with an SPS configuration for transmission in that configured SPS grant A WTRU may indicate when not using a specific grant so that eNB may re-allocate under the condition of multiple SPS grants configured. For example, when the WTRU is configured with multiple grants and uses only a subset (e.g., one) of the configured SPS grants in a specific subframe, the WTRU may be configured to indicate to the eNB which grant it will not use to the eNB so that the eNB may re-allocate the resources for another device. In one example, the WTRU may first determine which grant it will be using and then signal to the eNB (e.g., using a physical channel or other channel) which SPS grant (e.g., via an index) it will be using. The eNB may determine from this information which SPS grant or grants are not used so that the eNB may allocated the resources to another device). This approach is advantageous when multiple SPS grants are configured and the WTRU uses only one of the SPS grants. In another example, the WTRU may be configured with two SPS grants, and the WTRU may indicate the SPS grant index of the SPS grant it does not intend to use (e.g., the SPS grant canceled). To be effective, the indication may require to be transmitted a specific time before the actual SPS grant takes place.

Upper layer assistance for triggering SPS scheduling assistance is provided. For example, as already noted above, the WTRU may receive information from upper layers (e.g., upper layer indication of timing of message arrival, indication of a change in periodicity, indication of timing change, message tagged by upper layers, information based on WTRU providing timing to upper layers, and information related to vehicle dynamics changes). The WTRU may determine the need to send an offset or periodicity change to the eNB based on information from the upper layers. This may correspond to information from the application layer, or from an adaptation layer of which embodiments are described below.

Information received from upper layers is further described. Upper layer information may include upper layer indication of timing of message arrival. For example, the WTRU may receive, from the application layer or upper layers, an indication of the arrival of a CAM message. Such an indication may be received each time the upper layer sends such a message to the AS.

Upper layer information may include an indication of a change in periodicity. For example, the WTRU may receive, from the application layer or upper layers, an indication of a change in periodicity or interval for the CAM messages as well as the new period of CAM message.

Upper layer information may include an indication of timing change. For example, the WTRU may receive, from the application layer or upper layers, an indication that a change has occurred in the timing of CAM messages (or messages requiring SPS alignment) as determined by the upper layers. This indication may further contain the absolute time of the new timing of messages transmitted to the lower layers (e.g., the time of transmission of one instance of the periodic message stream). Alternatively, the indication may be sent to coincide with the transmission of a message with the new timing (e.g., the timing of the indication represents the timing of the message).

Upper layer information may include a message tagged by upper layers. For example, a CAM message, or message requiring SPS alignment, may be tagged or indicated as such by the upper layers. For example, the message may be tagged with a specific Packet Data Convergence. Protocol (PDCP) Service Data Unit (SDU) type identifying the message as a message requiring SPS alignment. The message may contain a specific value of PPPP (per packet priority) which indicates that this message requires SPS alignment. Further, this message may be received with other QoS related information, such as the QCI or similar information, where a specific value of QCI may represent the need for SPS alignment, and/or the timing related requirements, for example, a specific value for the packet delay budget (PDB) representing a 100 ms latency requirement and/or periodic data.

A WTRU may further be configured by the eNB so that all traffic or messages requiring alignment with SPS are assigned to a specific logical channel, radio bearer or the like. Such restriction may be based on application-layer information such as QCI or PPPP. For instance, the WTRU may assign all messages with a specific PPPP or QCI indicating the need for SPS alignment to a specific logical channel.

Upper layer information may include information based on WTRU providing timing to upper layers. For example, a WTRU, potentially upon configuration of SPS by the eNB, may provide the upper layers with the configured timing of the SPS in any of the following forms: the WTRU may provide to the upper layers or application layer the absolute time instance of the occurrence of one of the SPS resources; and/or the WTRU may provide, at some or each of the occurrences of an SPS resource, an indication or signal of the presence of such a resource at the AS. The application layer may, in addition, provide an indication to the lower layers that a change is needed in the timing of the SPS as currently configured, and the additional information needed to create the offset change message to the eNB (e.g. the time shift of the SPS resources or resource pattern required to meet the current application layer message generation)

Upper layer information may include information related to vehicle dynamics changes. For example, the AS may receive information related to change in vehicle dynamics such as: an indication of a change in speed, heading, or acceleration which exceed the event-triggering thresholds defined in conditions (1) and (2) described herein; an indication that either trigger condition (1) or (2) described above) occurs; and/or an indication that the speed, direction, or position has changed from a state where trigger condition (1) is valid to a state where it is not valid.

As described above, the CAM size may periodically change, depending on whether the V2X application wishes to transmit a high-frequency container, a low-frequency container, or other special containers. As a result, a fixed SPS allocation is not ideal to provide the resources required to transmit CAM. In addition, the eNB would need to be aware of the SPS allocation size required for the CAM message, but this information is present only in the WTRU (e.g., in the vehicles).

Accordingly, the SPS message size may be configured through an application layer. For example, the V2X application at the WRTU may provide the size information to a corresponding application in the network or at the eNB through application layer signaling, for example, as a CA basic service message. The size information which may be sent through application layer messages may include: container sizes; a pattern in which high-frequency container, low-frequency container, or special containers are sent; and/or any dynamic change in patterns occurring during operation, for example, when a V2X WTRU decides to send the low-frequency container more often than required.

The application layer at the network or eNB may provide this information to the eNB in order to define an appropriate SPS allocation size, and provide any additional dynamic scheduling for time instances in which the allocated SPS size needs to be increased, for example, additional containers may be included in the CAM messaging.

In another example, the SPS message size may be associated to a Quality of Service (QoS) Class Identifier (QCI) for a logical channel. For example, the required SPS allocation size, and potentially the pattern of CAM message size changes may be tied to the QCI associated with the V2X logical channel. When the V2X logical channel is established, the eNB may know or determine (e.g., based on pre-defined mapping, or from information obtained from a V2X application service in the network), the required size of the SPS allocation to be able to hold the CAM messages.

A WTRU may transmit a synchronization message to the eNB to indicate the timing and frequency of the transmission of the high frequency container and low frequency container, so that the WTRU may know or determine the time instances in which the SPS allocations need to be increased or overridden by a dynamic allocation. For instance, the message may indicate the SFN and subframe corresponding to the transmission of a low-frequency container, and that low-frequency containers are transmitted every X CAM messages.

In another example, allocation size changes may be piggybacked on SPS transmissions. For example, a WTRU may send a message indicating that the next upcoming CAM message will have an increased size (e.g., that it will contain a low-frequency container) and potentially also the increment in the size compared to the current SPS allocation. Such a message could be piggybacked as a MAC CE in the transmission of the current CAM message. The advantage of this solution compared to dynamic scheduling is that the WTRU does not need to send a separate SR or BSR when the larger CAM message arrives, and would therefore avoid additional delays (and also additional signaling) associated with the SR/BSR method.

In another example, the SPS allocation size may be periodically increased. For example, the WTRU may be configured with an SPS allocation which periodically increases beyond the resource allocation specified in the PDCCH with SPS C-RNTI. The increase in resource allocation may be fixed (e.g., always 2 times the SPS allocation), or it may be determined by the WTRU from signaling received from the eNB. For example, the SPS configuration itself in RRC signaling may contain the details of the increase in resource allocation for the SPS, how often it occurs, and the relation of the additional resource elements to the regular SPS allocation. In another example, the PDCCH with SPS C-RNTI itself, potentially using a new DCI, may indicate the amount of increase in the SPS allocation, and how often this increase occurs, along with the actual time-frequency location of the increased allocation.

An adaptation layer for managing SPS for CAM messages is provided. The V2X application which manages the construction and transmission of CAM messages (and other V2X messages such as Basic Safety Message (BSM) or Decentralized Environmental Notification Message (DENM)) may interface with different types of transports such as LTE (e.g., sidelink and Uu) as well as dedicated short range communications (DSRC). Since latency requirements need to be met regardless of the transport utilized, it may be best from an implementation view-point to build an adaptation layer which allows the V2X application to interface with the specific transport while meeting the latency requirements of the V2X message without the need to add transport layer specific information in the V2X application itself.

The adaptation layer for V2X to LTE may provide the following functionality with regards to SPS: enabling/disabling SPS based on whether vehicle dynamics justifies its use; and providing information to the AS to determine period and timing of SPS traffic. It should be noted that the functionality described for the adaptation layer may be within the AS or the application layer as well, depending on the specific implementation of the WTRU or the application layer residing on the WTRU.

With respect to enabling/disabling SPS for CAM traffic, the adaptation layer may send an indication to the lower layers to indicate when it may be advantageous to configure SPS (e.g., when CAM traffic is relatively periodic). A WTRU may further transmit this indication to the eNB to enable/disable the use of SPS (as described above).

The adaptation layer may make the determination of the use of SPS (i.e., the enabling/disabling thereof) based on vehicle dynamic or other information provided by the application layer, such as: whether the speed of the vehicle is above a certain threshold (indicating highway driving), the proximity of the vehicles with other vehicles travelling in the same or opposite direction, the global positioning system (GPS) information of the vehicle, the type of road on which the WTRU is travelling, and/or traffic information, such as the number of vehicles in the area surrounding the vehicle, or in the direction of travel of the vehicle.

Based on the above information, the adaptation layer may determine the level of periodicity of the CAM messages generated by the V2X application layer, and may send an indication to the lower layers in the WTRU as to whether SPS should be configured or not.

In another example, the adaptation layer, in making the same determination defined above, may provide the indication to a similar adaptation layer residing in the network. Such an adaptation layer in the network may provide this information (e.g., for a specific WTRU) directly to the eNB.

In order to determine the SPS periodicity, the LTE adaptation layer may receive, from the application layer, the instantaneous vehicle velocity. Such velocity may be provided to the adaptation layer periodically. Alternatively, the LTE adaptation layer may receive a new velocity or trigger when a change in velocity which exceeds a certain threshold has occurred. The adaptation layer may determine the required SPS periodicity and inform the AS layers of the required periodicity based on a simple lookup table. For example, a periodicity of x1 may be configured when the speed ranges from y11 to y12, a periodicity of x2 may be configured when the speed ranges from y21 to y22, and so on.

In order to determine the SPS timing the LTE adaptation layer may receive, from the application layer, the triggers corresponding to a CAM generation (i.e., trigger conditions (1) and (2)) described above. Namely: the absolute difference in heading exceeds a threshold (e.g. 4 degrees), the distance exceeds a threshold (e.g. 4 m), and/or a change in speed exceeds a threshold (e.g. 0.5 m/s). Such triggers may be received from the application layer using separate signaling (e.g., side information), or may be included in the CAM message itself.

The LTE adaptation layer may be provided, by the AS, with the frame and subframe timing based on any of the following methods: a signal or event sent for each subframe or interval or subframes, a frame and subframe counter maintained by the AS and readable/accessible by the LTE adaptation layer, and/or a function provided by the AS translating absolute time (maintained at the WTRU) into a frame and subframe time. The LTE adaptation layer may maintain the exact timing associated with the current SPS configuration based on its previous enabling of SPS at the AS. The exact timing may be maintained based on absolute time, or based on frame/subframe timing. Alternatively, the LTE adaptation layer may receive from the AS, the absolute time of the currently configured SPS configuration (e.g. as configured by the eNB), and the currently configured periodicity. Based on this information, the LTE adaptation layer may be able to calculate the timing of each SPS resource in time.

Compensation for AS delay is provided. For example, the adaptation layer may provide the AS with the desired timing of the SPS. Such timing may include a compensation for the delay of the AS (e.g., from the time the CAM message is generated to the time it is ready for transmission over the air). This compensation factor may be provided dynamically by the AS. This compensation factor may be determined by the LTE adaptation layer by using a static value which is related to the required delay. For instance, given a 100 ms maximum delay, the LTE adaptation layer may be configured with a compensation factor of 10 ms to account for the AS delay. This compensation factor may be determined by the LTE adaptation layer based on capability of the WTRU, network, etc., which may be provided in a subscriber identification module (SIM) card, WTRU storage/configuration, provided by the AS following network connection, and/or provided as part of application layer or NAS layer signaling by the network.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method performed by a wireless transmit/receive unit (WTRU), the method comprising:
    transmitting a message, from the WTRU to a base station, wherein the message indicates a traffic periodicity, a transport block size and a timing offset with respect to subframe number 0 of system frame number 0;
    receiving, by the WTRU from the base station, in response to the transmitted message, an index identifying a sidelink semi-persistent scheduling (SPS) configuration and an indication of one or more parameters associated with the sidelink SPS configuration; and
    transmitting data on a sidelink channel, by the WTRU to another WTRU, in accordance with the sidelink SPS configuration;
    wherein the sidelink SPS configuration is a sidelink SPS configuration of a plurality of sidelink SPS configurations associated with the WTRU.

2. The method according to claim 1, wherein the sidelink SPS configuration corresponds to a PC5 interface.

3. The method according to claim 1, further comprising:
    receiving an indication of the sidelink SPS configuration over a physical downlink control channel (PDCCH).

4. The method according to claim 1, further comprising:
    transmitting the data, in accordance with a logical channel priority (LCP).

5. The method according to claim 1, wherein the message includes a ProSe Per-Packet Priority (PPPP) information element.

6. The method according to claim 1, further comprising:
    receiving, by the WTRU from the base station, a deactivation message indicating deactivation of the sidelink SPS configuration.

7. A wireless transmit/receive unit (WTRU), the comprising:
    a transmitter configured to transmit a message, from the WTRU to a base station, wherein the message indicates a traffic periodicity and a timing offset with respect to subframe number 0 of system frame number 0;
    a receiver configured to receive, by the WTRU from the base station, in response to the transmitted message, an index identifying a sidelink semi-persistent scheduling (SPS) configuration and an indication of one or more parameters associated with the sidelink SPS configuration; and
    the transmitter further configured to transmit data, from the WTRU to another WTRU, on a sidelink channel in accordance with the sidelink SPS configuration;
    wherein the sidelink SPS configuration is a sidelink SPS configuration of a plurality of sidelink SPS configurations associated with the WTRU.

8. The WTRU according to claim 7, wherein the sidelink SPS configuration corresponds to a PC5 interface.

9. The WTRU according to claim 7, further comprising:
    the receiver further configured to receive an activation message indicating the sidelink SPS configuration, wherein the activation message is received over a physical downlink control channel (PDCCH).

10. The WTRU according to claim 7, further comprising:
    the transmitter further configured to transmit the data, in accordance with a logical channel priority (LCP).

11. The WTRU according to claim 7, wherein the message includes a ProSe Per-Packet Priority (PPPP) information element.

12. The WTRU according to claim 7, further comprising:
the receiver further configured to receive, by the WTRU from the base station, a deactivation message indicating deactivation of the sidelink SPS configuration.

13. A method performed by a base station, the method comprising:
receiving, from a WTRU, a message indicating a traffic periodicity, a transport block size and a timing offset with respect to subframe number 0 of system frame number 0; and
transmitting, to the WTRU, in response to the message, an index identifying a sidelink semi-persistent scheduling (SPS) configuration and an indication of one or more parameters associated with the sidelink SPS configuration;
wherein the sidelink SPS configuration is a sidelink SPS configuration of a plurality of sidelink SPS configurations associated with the WTRU.

14. The method according to claim 13, wherein the sidelink SPS configuration corresponds to a PC5 interface.

15. The method according to claim 13, wherein an indication of the sidelink SPS configuration is transmitted over a physical downlink control channel (PDCCH).

16. The method according to claim 13, wherein the message includes a ProSe Per-Packet Priority (PPPP) information element.

17. The method according to claim 13, further comprising:
transmitting, by the base station to the WTRU, a deactivation message indicating deactivation of the sidelink SPS configuration.

\* \* \* \* \*